United States Patent
Lou et al.

(10) Patent No.: US 12,244,418 B2
(45) Date of Patent: *Mar. 4, 2025

(54) METHOD AND SYSTEM FOR WIRELESS LOCAL AREA NETWORK (WLAN) LONG SYMBOL DURATION MIGRATION

(71) Applicant: InterDigital Patent Holdings, Inc., Wilmington, DE (US)

(72) Inventors: Hanqing Lou, Syosset, NY (US); Oghenekome Oteri, San Diego, CA (US); Rui Yang, Greenlawn, NY (US); Robert L. Olesen, Huntington, NY (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,857

(22) Filed: Jul. 19, 2023

(65) Prior Publication Data

US 2024/0022352 A1 Jan. 18, 2024

Related U.S. Application Data

(63) Continuation of application No. 17/474,971, filed on Sep. 14, 2021, now Pat. No. 11,750,323, which is a
(Continued)

(51) Int. Cl.
*H04L 1/00* (2006.01)
*H04L 1/18* (2023.01)
(Continued)

(52) U.S. Cl.
CPC .......... *H04L 1/0072* (2013.01); *H04L 1/0079* (2013.01); *H04L 1/18* (2013.01); *H04L 2101/622* (2022.05); *H04W 84/12* (2013.01)

(58) Field of Classification Search
CPC ....... H04L 1/0072; H04L 1/0079; H04L 1/18; H04L 2101/622; H04L 1/0028; H04L 1/0003; H04W 84/12
See application file for complete search history.

(56) References Cited

U.S. PATENT DOCUMENTS 8,824,371 B2   9/2014   Vermani et al.
8,971,213 B1   3/2015   Hart
(Continued)

FOREIGN PATENT DOCUMENTS

CN   101102245 A   1/2008
CN   102396186 A   1/2008
(Continued)

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211 V12.4.0, Dec. 2014.
(Continued)

*Primary Examiner* — Ahmed Elallam
(74) *Attorney, Agent, or Firm* — Flaster Greenberg P.C.

(57) ABSTRACT

A method performed by a STA may comprise receiving data of a MU-HE-PPDU, from an AP. The MU-HE-PPDU may comprise a HE-SIG-A field, a first HE-SIG-B portion and a second HE-SIG-B portion. The first HE-SIG-B portion may be received on a first channel and the second HE-SIG-B portion may be received on a second channel which is different than the first channel. The first HE-SIG-B portion may include one or more STA identifiers.

40 Claims, 20 Drawing Sheets

Related U.S. Application Data continuation of application No. 16/284,891, filed on Feb. 25, 2019, now Pat. No. 11,121,813, which is a continuation of application No. 15/555,786, filed as application No. PCT/US2016/021240 on Mar. 7, 2016, now Pat. No. 10,218,463.

(60) Provisional application No. 62/129,613, filed on Mar. 6, 2015.

(51) Int. Cl.
H04L 101/622 (2022.01)
H04W 84/12 (2009.01)

(56) References Cited

U.S. PATENT DOCUMENTS

| | | | |
|---|---|---|---|
| 8,982,889 | B2 | 3/2015 | Zhang |
| 9,338,789 | B2 | 5/2016 | Wang et al. |
| 9,503,931 | B2 | 11/2016 | Vermani et al. |
| 9,736,277 | B2 | 8/2017 | Lee |
| 9,813,210 | B2 * | 11/2017 | Kwak ............... H04L 27/2613 |
| 9,917,933 | B2 | 3/2018 | Seok |
| 9,955,469 | B2 | 4/2018 | Li et al. |
| 9,999,054 | B2 | 6/2018 | Kim et al. |
| 10,045,338 | B2 | 8/2018 | Lim et al. |
| 10,098,151 | B2 | 10/2018 | Kwon et al. |
| 10,104,688 | B2 | 10/2018 | Seok |
| 10,178,705 | B2 | 1/2019 | Seok |
| 10,218,463 | B2 | 2/2019 | Lou et al. |
| 10,278,172 | B2 * | 4/2019 | Chun ................. H04L 27/2602 |
| 10,327,226 | B2 | 6/2019 | Seok |
| 10,334,007 | B2 | 6/2019 | Chun et al. |
| 10,356,760 | B2 | 7/2019 | Kim et al. |
| 10,375,679 | B2 | 8/2019 | Chu et al. |
| 10,405,338 | B2 | 9/2019 | Chun et al. |
| 10,405,351 | B2 * | 9/2019 | Kwon ............... H04W 74/0816 |
| 10,448,383 | B2 | 10/2019 | Luo et al. |
| 10,469,631 | B2 | 11/2019 | Hedayat |
| 10,516,519 | B2 | 12/2019 | Seok |
| 10,541,792 | B2 | 1/2020 | Seok |
| 10,542,526 | B2 | 1/2020 | Seok |
| 10,601,474 | B2 * | 3/2020 | Park .................... H04L 1/0061 |
| 10,602,501 | B2 * | 3/2020 | Li ....................... H04L 1/0072 |
| 10,721,768 | B2 | 7/2020 | Lin et al. |
| 10,743,309 | B2 | 8/2020 | Seok |
| 10,749,647 | B2 | 8/2020 | Seok |
| 10,785,772 | B2 | 9/2020 | Chun et al. |
| 10,869,320 | B2 * | 12/2020 | Chun ................. H04L 27/2601 |
| 11,019,120 | B2 * | 5/2021 | Chun ..................... H04L 1/00 |
| 11,057,253 | B2 * | 7/2021 | Lim .................... H04W 48/12 |
| 11,121,813 | B2 | 9/2021 | Lou et al. |
| 11,601,972 | B2 | 3/2023 | Lin et al. |
| 11,889,549 | B2 * | 1/2024 | Lin ...................... H04L 5/0053 |
| 2008/0004017 | A1 | 1/2008 | Shimizu |
| 2008/0109711 | A1 | 5/2008 | Morioka et al. |
| 2010/0260159 | A1 | 10/2010 | Zhang et al. |
| 2013/0286959 | A1 | 3/2013 | Lou et al. |
| 2013/0128806 | A1 | 5/2013 | Vermani et al. |
| 2013/0176980 | A1 | 7/2013 | Kneckt et al. |
| 2013/0301551 | A1 | 11/2013 | Ghosh et al. |
| 2013/0329620 | A1 | 12/2013 | Kim et al. |
| 2014/0010177 | A1 | 1/2014 | Wentink |
| 2014/0078966 | A1 | 3/2014 | Erceg et al. |
| 2014/0307612 | A1 | 4/2014 | Vermani et al. |
| 2014/0334476 | A1 | 7/2014 | Cheong et al. |
| 2015/0003367 | A1 | 1/2015 | Seok |
| 2015/0009894 | A1 | 1/2015 | Vermani et al. |
| 2015/0009979 | A1 | 1/2015 | Noh et al. |
| 2015/0023335 | A1 | 1/2015 | Vermani et al. |
| 2016/0088665 | A1 | 3/2016 | Kim et al. |
| 2016/0262157 | A1 | 3/2016 | Kim et al. |
| 2016/0127948 | A1 | 5/2016 | Azizi et al. |
| 2016/0174200 | A1 | 6/2016 | Seok |
| 2016/0204915 | A1 | 7/2016 | Chen et al. |
| 2016/0255656 | A1 | 9/2016 | Lou et al. |
| 2016/0353370 | A1 | 12/2016 | Choi et al. |
| 2017/0251458 | A1 | 5/2017 | Luo et al. |
| 2017/0208546 | A1 | 7/2017 | Park et al. |
| 2017/0222769 | A1 | 8/2017 | Li et al. |
| 2017/0245306 | A1 | 8/2017 | Kim et al. |
| 2017/0251432 | A1 | 8/2017 | Park et al. |
| 2017/0279864 | A1 | 9/2017 | Chun et al. |
| 2017/0303280 | A1 | 10/2017 | Chun et al. |
| 2017/0367078 | A1 | 12/2017 | Chun et al. |
| 2017/0373901 | A1 | 12/2017 | Lim et al. |
| 2018/0160429 | A1 | 1/2018 | Seok |
| 2018/0242293 | A1 | 4/2018 | Li et al. |
| 2018/0310330 | A1 | 10/2018 | Chun et al. |
| 2020/0037331 | A1 | 1/2020 | Chun et al. |

FOREIGN PATENT DOCUMENTS

| | | |
|---|---|---|
| CN | 102474492 A | 5/2012 |
| CN | 103002505 A | 3/2013 |
| CN | 103430601 A | 12/2013 |
| CN | 103548294 A | 1/2014 |
| CN | 103548295 A | 1/2014 |
| CN | 103563279 A | 2/2014 |
| CN | 104255068 A | 12/2014 |
| CN | 104272605 A | 1/2015 |
| CN | 104301278 A | 1/2015 |
| CN | 104363192 A | 2/2015 |
| EP | 2357773 A2 | 8/2011 |
| KR | 20160105462 A | 9/2016 |
| WO | WO 2012/028030 A1 | 3/2012 |
| WO | WO 2014011506 A2 | 1/2014 |
| WO | WO 2014193547 A1 | 12/2014 |
| WO | WO 2015003119 A1 | 1/2015 |

OTHER PUBLICATIONS

3rd Generation Partnership Project, Technical Specification Group Radio Access Network; Evolved Universal Terrestrial Radio Access (E-UTRA); Physical channels and modulation (Release 12), 3GPP TS 36.211 V12.8.0, Dec. 2015.

3rd Generation Partnership Project, Technical Specification Group Radio Access Network; Evolved Universal Terrestrial Radio Access (E-UTRA); Physical channels and modulation (Release 12), 3GPP TS 36.211 V13.0.0, Dec. 2015.

*Bushnell Hawthorne, LLC v. Cisco Sys., Inc.*, 1:18-cv-00760-TSE MSN, Judge T. S. Ellis, III, May 14, 2020, 10 pages.

IEEE 802.11-12/0320r1, Partial AID and GID, Merlin et al., Mar. 2012.

IEEE 802.11-15/0099, Payload Symbol Size for 11ax, PORAT et al., Jan. 2015.

IEEE 802.11-15/0101 r1, Preamble structure for 11ax system, Zhang, Jan. 2015.

IEEE 802.11-15/0132r8, Specification Framework for TGax, Stacey, IEEE P802.11, Wireless LANs, Sep. 2015.

IEEE 802.11-15/1059r2, SIG-B Encoding Structure Part II, Porat et al., Nov. 6, 2015.

IEEE 802.11-15/1335r2, HE-SIG-B Contents, Liu et al., Nov. 9, 2015.

IEEE 802.11-15/1354r0, SIG-A Fields and Bitwidths, Porat et al., Nov. 8, 2015.

IEEE 802.11-16/0024r0, Proposed TGax draft specification, Stacey et al. IEEE P802.11 Wireless LANs, Jan. 15, 2016.

IEEE 802.11afD1.02, Telecommunications and information exchange between systems—Local and metropolitan area networks, Draft Standard for Information Technology Specific requirements; Part 11: Wireless LAN Medium access Control (MAC) and Physical Layer (PHY) specifications; Amendment 3: Television White Spaces (TVWS) Operation, Jun. 2011.

IEEE 802.11af-2013, Telecommunications and information exchange between systems—Local and metropolitan area networks, IEEE Standard for Information Technology-Specific requirements; Part 11: Wireless LAN Medium Access Control (MAC) and Physical

(56) References Cited

OTHER PUBLICATIONS

Layer (PHY) specifications; Amendment 5: Television White Spaces (TVWS) Operation, Dec. 11, 2013.

IEEE P802.11ac/D2.0, Telecommunications and information exchange between systems—Local and metropolitan area networks, Draft Standard for Information Technology Specific requirements; Part 11: Wireless LAN Medium Access Control (MAC) and Physical Layer (PHY) specifications; Amendment 4: Enhancements for Very High Throughput for Operation in Bands below 6GHZ, Jan. 2012.

IEEE P802.11ah/D5.0, Telecommunications and information exchange between systems Local and metropolitan area networks, Draft Standard for Information technology Specific requirements; Part 11: Wireless LAN Medium Access Control (MAC) and Physical Layer (PHY) Specifications; Amendment 6: Sub 1 GHz License Exempt Operation.

IEEE Std 802.11 n-2009, Telecommunications and information exchange between systems—Local and metropolitan area networks, Specific requirements; Part 11: Wireless LAN Medium Access Control (MAC) and Physical Layer (PHY) Specifications; Amendment 5: Enhancements for Higher Throughout, Sep. 2009.

IEEE Std. 802.Nov. 2012, Telecommunications and information exchange between systems Local and metropolitan area networks, IEEE Standard for Information technology—Specific requirements; Part 11: Wireless LAN Medium Access Control (MAC) and Physical Layer (PHY) Specifications, Mar. 29, 2012.

IEEE Std. 802.11-REVmb/D12, Telecommunications and information exchange between systems Local and metropolitan area networks, IEEE Standard for Information technology—Specific requirements; Part 11: Wireless LAN Medium Access Control (MAC) and Physical Layer (PHY) Specifications.

IEEE 802.11-15/0132r15, Specification Framework for TGax, Jan. 2016, 43 pages.

IEEE Std 802.11ax™, IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications Amendment 1: Enhancements for High Efficiency WLAN, Feb. 2021, 767 pages.

*IPXL Holdings, L.L.C.* v. *Amazon*, United States Court of Appeals for the Federal Circuit, 05-1009, -1487, 17 pages.

3$^{rd}$ Generation partnership Project; "Draft Report of TSG SA Meeting #59", Secretary TSG SA (Maurice Pope, MCC), 3GPP TSG SA Meeting #60, TD-130163, Oranjestad, Aruba, Jul. 17-19, 2013, 89 pages.

\* cited by examiner

| Field | VHT MU PPDU Allocation (bits) | | | VHT SU PPDU Allocation (bits) | | | Description |
|---|---|---|---|---|---|---|---|
| | 20 MHz | 40 MHz | 80 MHz, 160 MHz, 80+80 MHz | 20 MHz | 40 MHz | 80 MHz, 160 MHz, 80+80 MHz | |
| VHT-SIG-B Length | B0-B15 (16) | B0-B16 (17) | B0-B18 (19) | B0-B16 (17) | B0-B18 (19) | B0-B20 (21) | Length of A-MPDU pre-EOF padding in units of four octets |
| VHT-MCS | B16-B19 (4) | B17-B20 (4) | B19-B22 (4) | N/A | N/A | N/A | |
| Reserved | N/A | N/A | N/A | B17-B19 (3) | B19-B20 (2) | B21-B22 (2) | All ones |
| Tail | B20-B25 (6) | B21-B26 (6) | B23-B28 (6) | B20-B25 (6) | B21-B26 (6) | B23-B28 (6) | All zeros |
| Total # bits | 26 | 27 | 29 | 26 | 27 | 29 | |

| Condition | GROUP_ID | PARTIAL_AID |
|---|---|---|
| Addressed to AP | 0 | BSSID[39:47] |
| Addressed to Mesh STA | 0 | RA[39:47] |
| Sent by an AP and addressed to a STA associated with that AP or sent by a DLS or TDLS STA in direct path to a DLS or TDLS peer STA | 63 | $(dec(AID[0:8]) + dec(BSSID[44:47]$     (9-8a)<br>$\oplus \ BSSID[40:43]) \times 2^5) \ mod \ 2^9$<br><br>where<br><br>   $\oplus$ is a bitwise exclusive OR operation<br><br>   $mod$ X indicates the X-modulo operation<br><br>   $dec(A[b:c])$ is the cast to decimal operator where digit $b$ is scaled by $2^0$ and $c$ by $2^{c-b}$ |
| Otherwise (see NOTE) | 63 | 0 |
| NOTE - The last row covers the following cases:<br>- A PPDU sent to an IBSS STA<br>- A PPDU sent by an AP to a non associated STA<br>- Any other condition not explicitly listed elsewhere in the table | | |

| Symbol | Bit | Field | Number of bits | Description |
|---|---|---|---|---|
| SIG-1 | B0 | Reserved | 1 | Reserved Set to 1. |
| | B1 | STBC | 1 | Set to 1 if all spatial streams have space time block coding and set to 0 if no spatial streams has space time block coding. |
| | B2 | Uplink Indication | 1 | Set to the value of the TXVECTOR parameter UPLINK_INDICATION. |
| | B3-B4 | BW | 2 | Set to 0 for 2 MHz, 1 for 4 MHz, 2 for 8 MHz, 3 for 16 Mhz |
| | B5-B6 | Nsts | 2 | Set to 0 for 1 space time stream<br>Set to 1 for 2 space time streams<br>Set to 2 for 3 space time streams<br>Set to 3 for 4 space time streams |
| | B7-B15 | ID | 9 | If Uplink Indication is not present or set to 1, set to the value of the TXVECTOR parameter PARTIAL_AID. PARTIAL_AID provides an abbreviated indication of the intended recipient(s) of the PSDU (See Table 9.19a (Group Id, partial AID, Uplink Indication and COLOR in SIG PPDUs))).<br>If Uplink Indication is set to 0, B7-B9 are set to the value of the TXVECTOR parameter COLOR and B10-B15 are set to the value of the TXVECTOR parameter PARTIAL_AID. |
| | B16 | Short GI | 1 | Set to 0 if short guard interval is not used in the Data field.<br>Set to 1 if short guard interval is used in the Data field. |
| | B17-B18 | Coding | 2 | B17 set to 0 for BCC and 1 for LDPC<br><br>If B17 is 1, B18 is set to 1 if the LDPC PPDU encoding process (of an SU PPDU), results in an extra OFDM symbol (or symbols) as described in 22.3.10.5.4 (LPDC coding), otherwise set to 0.<br><br>If B17 is 0, B18 is reserved and set to 1. |
| | B19-B22 | MCS | 4 | MCS Index |
| | B23 | Smoothing | 1 | A value of 1 indicates that channel smoothing is recommended.<br>A value of 0 indicates that channel smoothing is not recommended. |

FIG. 8

| Condition | PARTIAL_AID |
|---|---|
| A frame that is addressed to an AP | $(dec(BSSID[39:47])mod(2^9-1))+1$ |
| A frame that is sent by an AP and addressed to a STA associated with that AP or sent by a DLS or TDLS STA in a direct path to a DLS or TDLS peer STA, or to a group of STAs with a common Multicast AID and a common BSSID | $(dec(AID[0:8])+2^5 \times dec(BSSID[BSSID[44:47]$ $\oplus BSSID[40:43]))mod\ 2^9$  (9-8b)<br><br>where<br><br>$\oplus$ is a bitwise exclusive OR operation<br><br>$mod\ X$ indicates the X-modulo operation<br><br>$dec(A[b:c])$ is the cast to decimal operator where the digit $b$ has weight $2^0$ and the digit $c$ has weight $2^{c-b}$ |
| Otherwise | 0 |

FIG. 9

| Condition | PARTIAL_AID |
|---|---|
| A frame that is not a Control frame that is addressed to an AP | $(dec(BSSID[39:47])mod(2^9-1))+1$ |
| A frame that is not a Control frame that is sent by an AP and addressed to a STA associated with that AP or is sent by a DLS or TDLS STA in a direct path to a DLS or TDLS peer STA or is sent to a group of STAs with a common Multicast AID and a common BSSID | $(dec(AID[0:8])+2^5 \times dec(BSSID[BSSID[44:47]$ $\oplus BSSID[40:43]))mod\ 2^6$  (9-8c)<br><br>where<br><br>$\oplus$ is a bitwise exclusive OR operation<br><br>$mod\ X$ indicates the X-modulo operation<br><br>$dec(A[b:c])$ is the cast to decimal operator where the digit $b$ has weight $2^0$ and the digit $c$ has weight $2^{c-b}$ |
| Otherwise | 0 |

FIG. 10

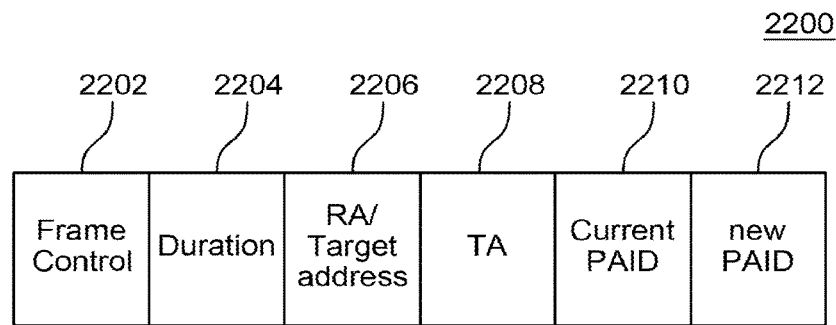
FIG. 22
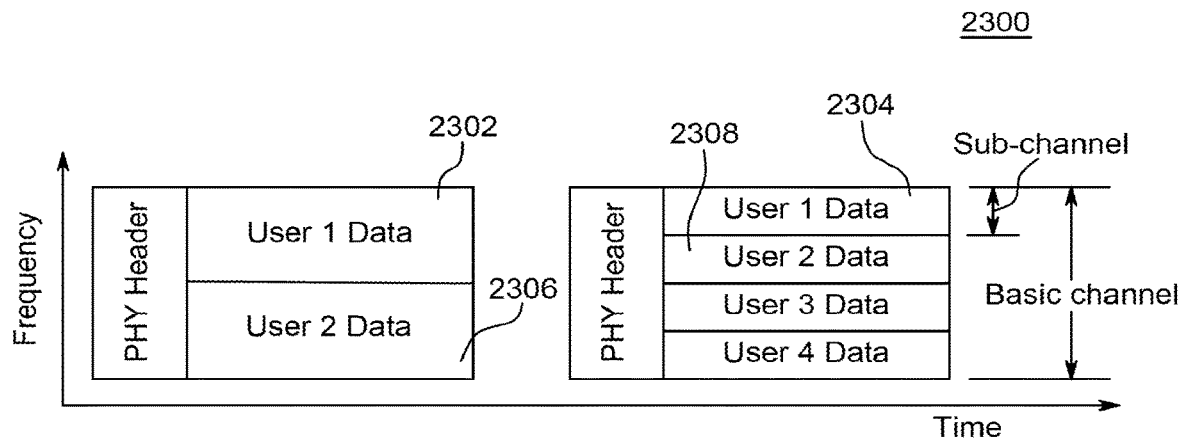
FIG. 23A
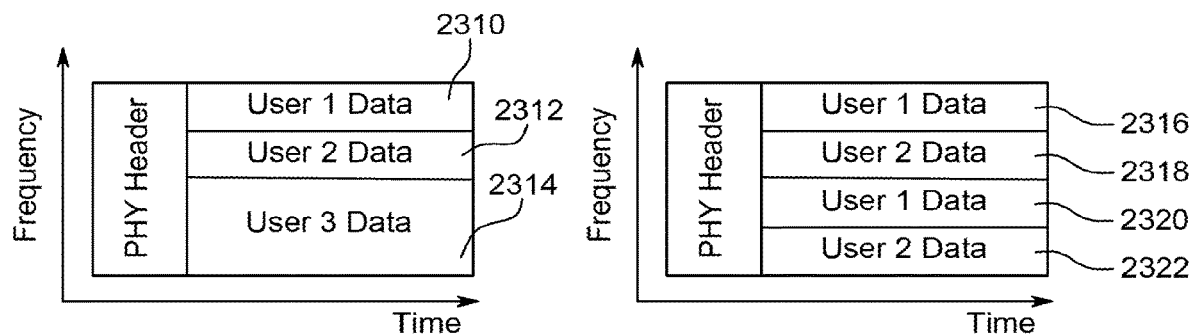
FIG. 23B
FIG. 23C

METHOD AND SYSTEM FOR WIRELESS LOCAL AREA NETWORK (WLAN) LONG SYMBOL DURATION MIGRATION

CROSS REFERENCE TO RELATED APPLICATIONS

This application is a continuation of U.S. patent application Ser. No. 17/474,971, filed on Sep. 14, 2021, which is a continuation of U.S. patent application Ser. No. 16/284,891, filed Feb. 25, 2019, which issued as U.S. Pat. No. 11,121,813, on Sep. 14, 2021, which is a continuation of U.S. patent application Ser. No. 15/555,786, filed on Sep. 5, 2017, which issued as U.S. Pat. No. 10,218,463 on Feb. 26, 2019, which is the U.S. National Stage, under 35 U.S.C. § 371, of International Patent Application No. PCT/US2016/021240, filed on Mar. 7, 2016, which claims the benefit of U.S. Provisional Application No. 62/129,613, filed Mar. 6, 2015, the entire contents of which are hereby incorporated by reference herein.

BACKGROUND

A wireless local area network (WLAN) in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN in Independent BSS (IBSS) mode has no AP and STAs communicate directly with each other. This mode of communication is referred to as "ad-hoc" mode of communication.

In the current 802.11 infrastructure mode of operation, the AP transmits a beacon on a fixed channel called the primary channel. This channel is 20 megahertz (MHz) wide and is the operating channel of the BSS. This channel is also used by the STAs to establish a connection with the AP.

SUMMARY

A method and a system are disclosed for wireless local area network (WLAN) long symbol duration migration toward packets having larger Fast Fourier Transform (FFT) sizes for data transmission. The WLAN may operate in Infrastructure Basic Service Set (BSS) mode with an Access Point (AP) and one or more stations (STAs). An AP may receive an association request from a STA. The AP may then create an association identifier (AID) for the STA. Further, the AP may determine a media access control (MAC) address or representation of a MAC address, wherein the representation includes a Receive Address (RA) or Transmit Address (TA) or both. The representation may be a partial association identifier (PAID). The AP may determine the PAID according to the AID. The AP may check for PAID collisions.

The AP may then transmit the representation in an association response frame based on a determination that there are no PAID collisions. Further, the AP may cycle through possible AIDs to find one for use in avoiding collisions based on a determination that there are PAID collisions. The AP may then transmit an association response based on the AID for use in avoiding collisions. The AP may use a first set and a second set of equations to create the PAID.

A STA may perform packet detection and decode a legacy preamble of a detected packet including a legacy short training field (L-STF), a legacy long training field (L-LTF), and a legacy signal (L-SIG) field. The STA may decode a high efficiency signal A (HE-SIG-A) field to obtain a first partial association identifier (PAID) comprising group information. If the decoded group information matches group information stored in a memory of the STA, the STA may decode a high efficiency (HE) preamble and a high efficiency signal B (HE-SIG-B) field of the detected packet. The HE-SIG-B field may include a station identifier within the group. When the group information is combined with the station identifier, the STA may determine an accurate address.

A method performed by an AP may comprise transmitting a multi-user (MU) HE physical layer convergence procedure (PLCP) protocol data unit (PPDU) (MU-HE-PPDU), on a first 20 megahertz (MHz) channel and a second 20 MHz channel, to a plurality of stations (STAs). The MU-HE-PPDU may comprise a high efficiency signal A (HE-SIG-A) portion carried on the first 20 MHz channel and the second 20 MHz channel. The MU-HE-PPDU may comprise a first high efficiency signal B (HE-SIG-B) portion carried on the first 20 MHz channel and a second HE-SIG-B portion carried on the second 20 MHz channel.

BRIEF DESCRIPTION OF THE DRAWINGS

A more detailed understanding may be had from the following description, given by way of example in conjunction with the accompanying drawings wherein:

FIG. 4 is a diagram of an example of a Very High Throughput Signal B (VHT-SIG-B) field defined in 802.11 ac;

FIG. 6 is a diagram of an example of a partial association identifier (PAID) as defined in 802.11ac;

FIG. 7 is a diagram of a PPDU format with a larger Fast Fourier Transform (FFT) size for data transmission;

FIG. 8 is a diagram of an example of a SIG field of a short preamble in 802.11ah;

FIG. 9 is a diagram of an example of a PAID for Non-Data Packet (NDP) frames in 802.11ah;

FIG. 10 is a diagram of an example of a PAID for non-NDP and non-1 MHz PPD frames in 802.11ah;

FIG. 22 is a diagram of an example of a PAID change frame;

FIG. 23A is a diagram of an example of sub-channels and basic channels;

FIG. 23B is another diagram of an example of sub-channels and basic channels in which for different users, at the same instant in time, bandwidth allocations may be different;

FIG. 23C is a third example diagram of sub-channels and basic channels in which multiple sub-channels may be allocated to a STA either contiguously or non-contiguously;

DETAILED DESCRIPTION

Figure 1A:
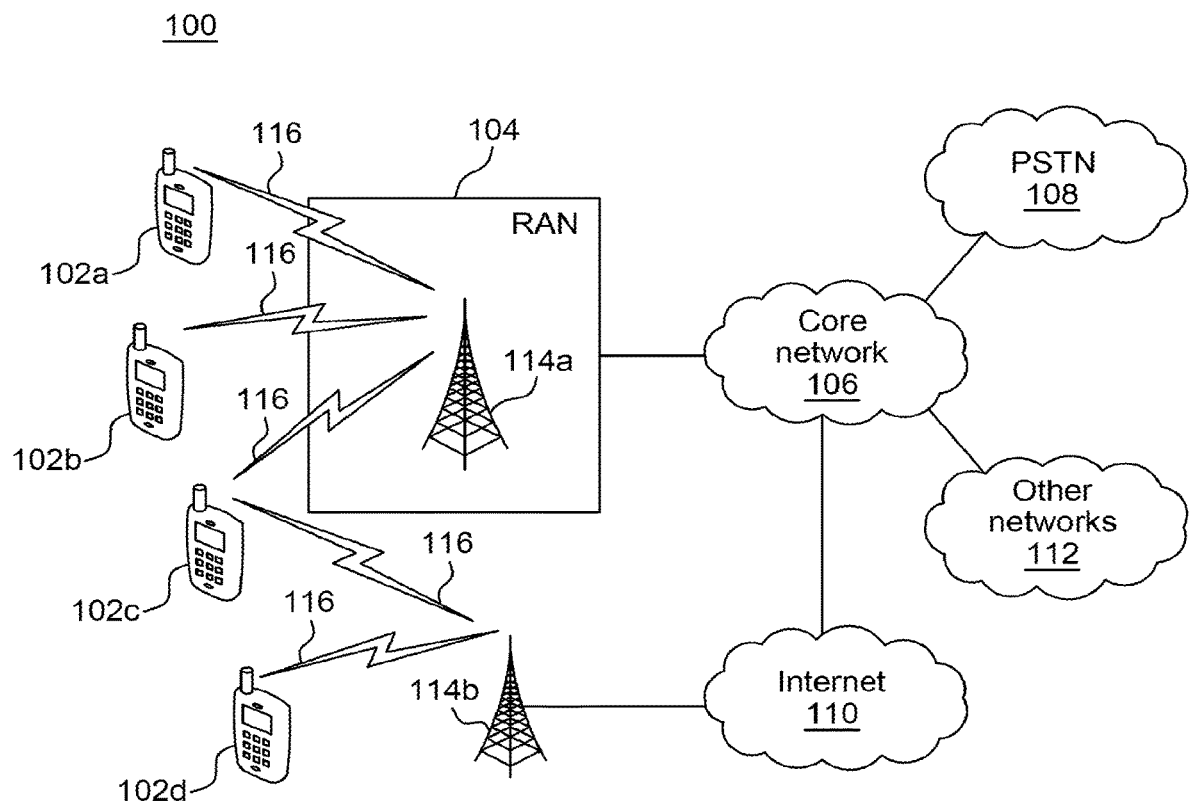
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1.times., CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
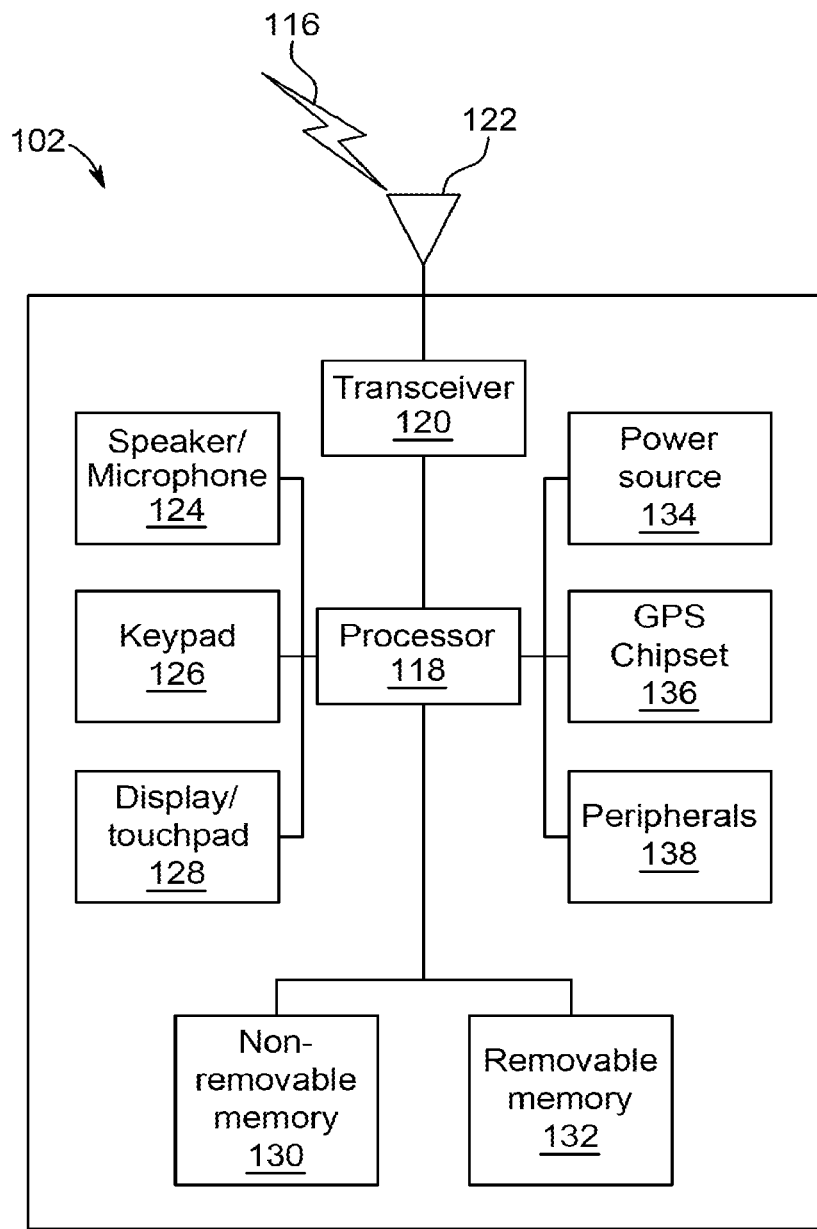
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
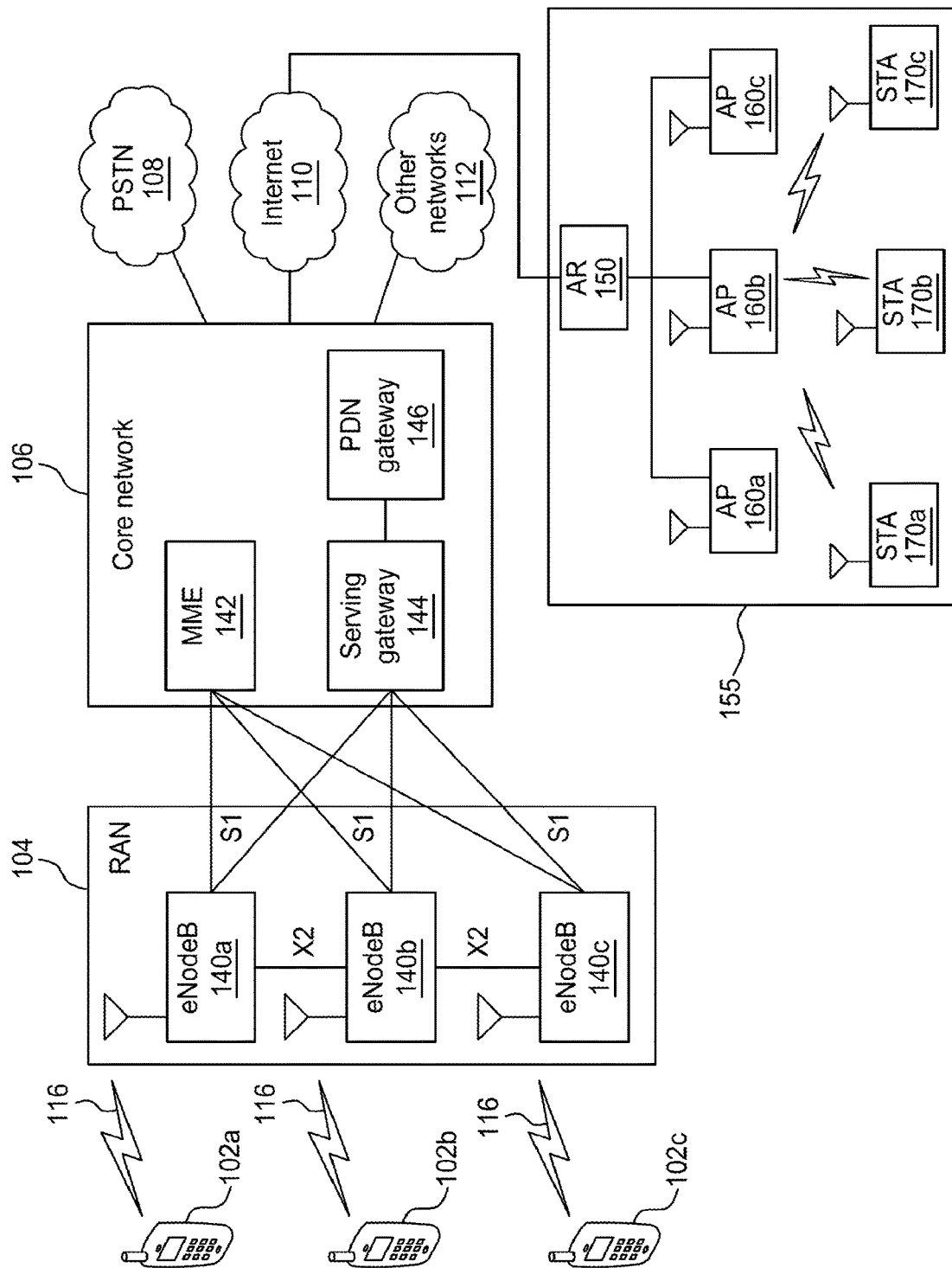
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with stations (STAs) 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The fundamental channel access mechanism in an 802.11 system may be Carrier Sense Multiple Access with Collision Avoidance (CSMA/CA). In this mode of operation, every STA, including the AP, may sense the primary channel. If the channel is detected to be busy, the STA may back off. Hence only one STA can transmit at any given time in a given Basic Service Set (BSS).

For reference, 802.11n, and 802.11ac, have been defined for operation in frequencies from 2 to 6 gigahertz (GHz). In 802.11n, High Throughput (HT) STAs can use a 40 megahertz (MHz) wide channel for communication. This may be achieved by combining a primary 20 MHz channel, with another adjacent 20 MHz channel to form a 40 MHz wide channel. In 802.11ac, Very High Throughput (VHT) STAs can support 20 MHz, 40 MHz, 80 MHz and 160 MHz wide channels. While 40 MHz and 80 MHz channels may be formed by combining contiguous 20 MHz channels similar to 802.11n above, a 160 MHz channel may be formed either by combining 8 contiguous 20 MHz channels or two non-contiguous 80 MHz channels (80+80 configuration).

As an example for the "80+80" configuration, the data, after channel encoding, may be passed through a segment parser that divides it into two streams. Inverse Fast Fourier Transform (IFFT) and time domain processing may be done on each stream separately. The streams may then be mapped on to the two channels and the data may be sent out. On the receiving end, this mechanism may be reversed and the combined data may be sent to the media access control (MAC).

For reference 802.11af, and 802.11ah, have been introduced for operation in frequencies that are less than 1 GHz. For 802.11af, and 802.11ah, the channel operating bandwidths may be reduced as compared to 802.11n, and 802.11ac. 802.11af may support 5 MHz, 10 MHz and 20 MHz wide bands in TV White Space (TVWS) while 802.11ah may support 1 MHz, 2 MHz, 4 MHz, 8 MHz and 16 MHz in non-TVWS. Some STAs in 802.11ah are considered to be sensors with limited capabilities and may only support 1 and 2 MHz transmission modes.

In the existing WLAN systems which utilize multiple channel widths such as 802.11n, 802.11ac, 802.11af, and 802.11ah, there may be a primary channel which usually has a bandwidth equal to the largest common operating bandwidth supported by all STAs in the BSS. The bandwidth of the primary channel may be, therefore, limited by the STA that supports the smallest bandwidth operating mode. In the example of 802.11ah, the primary channel may be 1 or 2 MHz wide if there are STAs that may only support 1 and 2 MHz modes, while the AP and other STAs in the BSS can support 4 MHz, 8 MHz and 16 MHz operating modes. All carrier sensing, and NAV settings, may depend on the status on the primary channel; i.e., if the primary channel is busy, for example, due to a STA supporting only 1 and 2 MHz operating modes transmitting to the AP, then the entire available frequency bands may be considered busy, even though majority of it stays idle and available. In 802.11ah and 802.11af, all packets may be transmitted using a clock that is down clocked 4 or 10 times as compared to the 802.11ac specification.

In the United States, the available frequency bands which can be used by 802.11ah may be from 902 MHz to 928 MHz. In Korea it may be from 917.5 MHz to 923.5 MHz; and in Japan, it may be from 916.5 MHz to 927.5 MHz. The total bandwidth available for 802.11ah may be 6 MHz to 26 MHz, depending on the country code.

To improve spectral efficiency, 802.11ac has introduced the concept for downlink Multi-User MIMO (MU-MIMO) transmission to multiple STAs in the same symbol's time frame, e.g. during a downlink OFDM symbol. The potential for the use of downlink MU-MIMO is also currently considered for 802.11ah. It is important to note that since downlink MU-MIMO, as it is used in 802.11ac, may use the same symbol timing to multiple STAs, interference of the waveform transmissions to multiple STAs may not be an issue. However, all STAs involved in MU-MIMO transmission with the AP may use the same channel or band, and this may limit the operating bandwidth to the smallest channel bandwidth that is supported by the STAs which are included in the MU-MIMO transmission with the AP.

IEEE 802.11ac may support communications using the entire available bandwidth for a particular resource allocation. OFDMA technologies may enable more efficient utilization of spectral resources and may be currently supported by the WiMax and LTE communications protocols. IEEE 802.11ax may enhance the performance of 802.11ac, including possibly addressing spectral efficiency, area throughput, and robustness to collisions and interference.

In an example, 802.11ax systems may use a modified symbol duration and physical (PHY) header format. The modified symbol duration may be a longer duration. The data symbols in a high efficiency (HE) PHY layer convergence procedure (PLCP) protocol data unit (PPDU) may use a discrete Fourier transform (DFT) period of 12.8 microseconds (us) and subcarrier spacing of 78.125 kilohertz (kHz). Moreover, data symbols in an HE PPDU may support guard interval durations of 0.8 us, 1.6 us and 3.2 us. An HE PPDU may include the legacy preamble (legacy short training field (L-STF), legacy long training field (L-LTF) and legacy signal (L-SIG)), duplicated on each 20 MHz, for backward compatibility with legacy devices. A High Efficiency Signal A (HE-SIG-A) field, for example using a DFT period of 3.2 us and subcarrier spacing of 312.5 kHz, may be duplicated on each 20 MHz after the legacy preamble to indicate common control information.

Methods that have been developed to address these requirements for 802.11ax are known as Coordinated Orthogonal Block-based Resource Allocation (COBRA), and Multi-User Parallel Channel Access (MU-PCA). These technologies may enable transmissions over a smaller frequency-time resource unit than is possible in 802.11ac. Thus multiple users may be allocated to non-overlapping frequency-time resource unit(s), which may enable simultaneous transmission and reception on orthogonal frequency-time resources. This may allow the frequency-time resources to be more efficiently utilized, and the quality of service (QoS) may also be improved. A sub-channel may be defined as a basic frequency resource unit that an AP may allocate to a STA. As an example, keeping the requirement of backward compatibility with 802.11n/ac in mind, a sub-channel may be defined as a 20 MHz channel.

Figure 2:
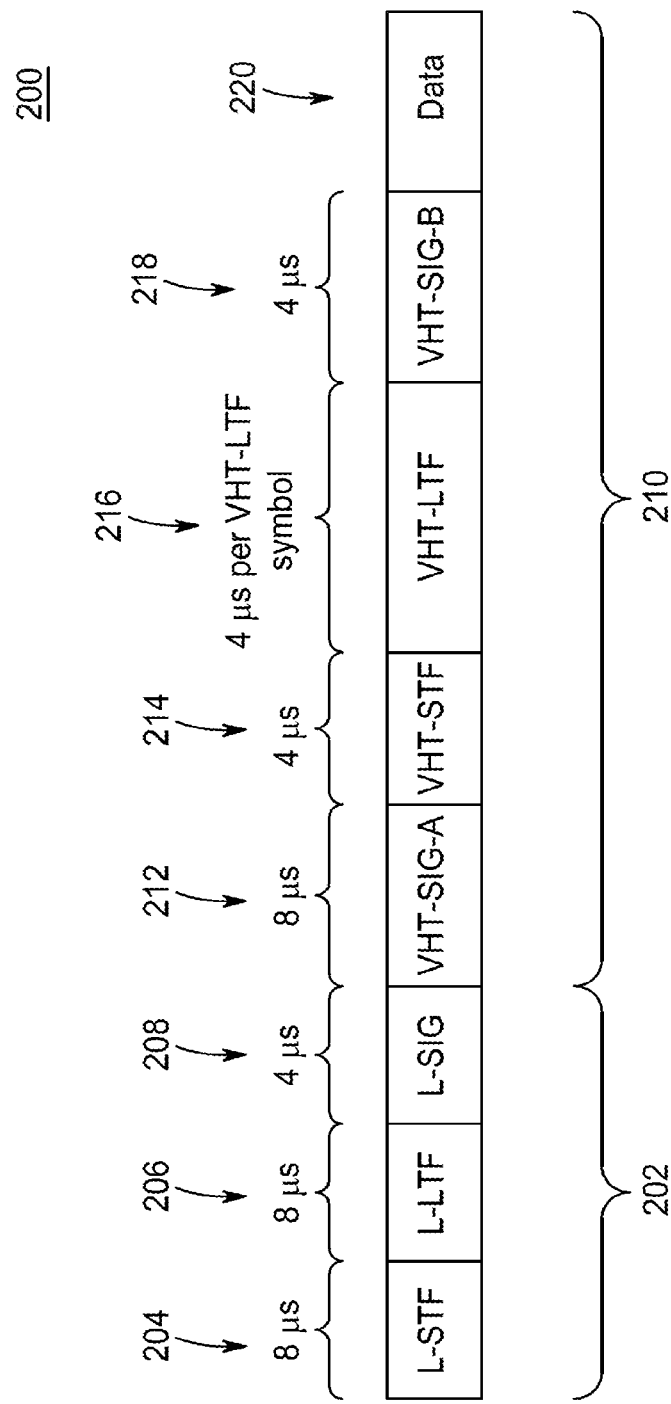
FIG. 2 is a diagram of an example of a Very High Throughput (VHT) physical (PHY) layer convergence procedure (PLCP) protocol data unit (PPDU) format defined in 802.11ac.
Figure 3:
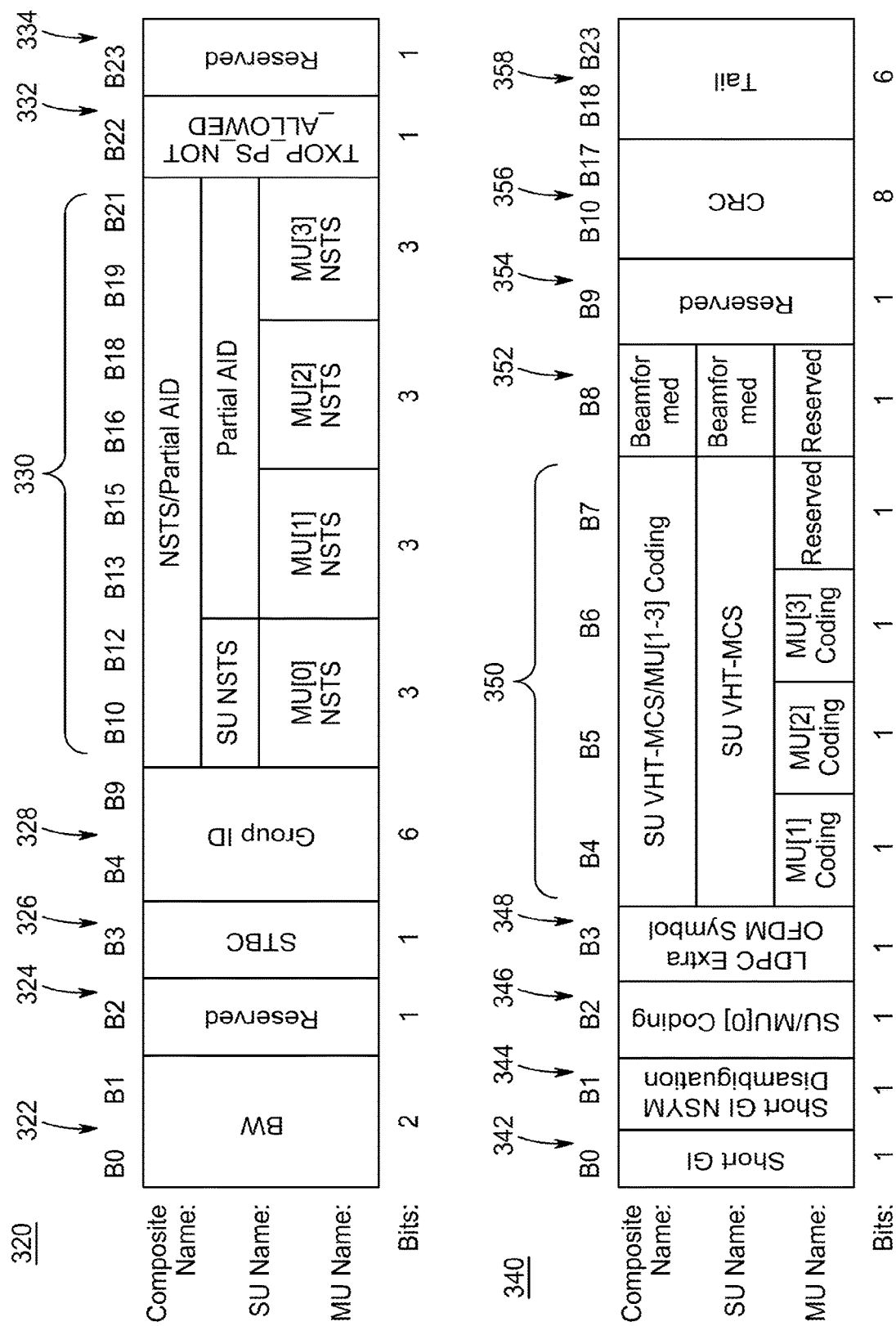
FIG. 3 is a diagram of an example of a Very High Throughput Signal A (VHT-SIG-A) field defined in 802.11 ac.

FIG. 2 is a diagram of an example of a VHT PPDU format defined in 802.11ac. A PHY header defined in 802.11 may normally include a legacy short training field 204, legacy long training field 206, and a legacy signaling field 208. With a different version, the PHY header may contain a legacy part 202 and a non-legacy part 210. Non-legacy part 210 includes a VHT-SIG_A 212, a VHT-STF 214, a VHT-LTF 216, a VHT-SIG-B 218, and data 220 FIG. 3 is a diagram of an example of a VHT-SIG-A field defined in 802.11 ac which may include two structures. In an example, a VHT-SIG-A1 may have a defined structure 320. VHT-SIG-A1 320 may include a bandwidth field 322, a reserved bit field 324, an STBC field 326, a group ID field 328, an NSTS/partial AID field 330, a TXOP_PS_NOT_ALLOWED field 332, and a reserved bit field 334. In a further example, a VHT-SIG-A2 may also have a defined structure 340. VHT-SIG-A2 340 may include a short guard interval (GI) field 342, a short GI NSYM disambiguation 344, an SU/MU[0] coding field 346, an LDPC extra OFDM symbol 348, a SU VHT-MCS/MU[1-3] coding field 350, a beamformed field 352, a reserved bit 354, a CRC 356, and a tail 358.

FIG. 4 is a diagram of an example of a VHT-SIG-B field 400 defined in 802.11 ac. In an example, a VHT-SIG-B 400 may include several fields which include a VHT-SIG-B length 402, a VHT-MCS 404, a reserved field 406, a tail 408, and a field indicative of a total number of bits 410

Figure 5:
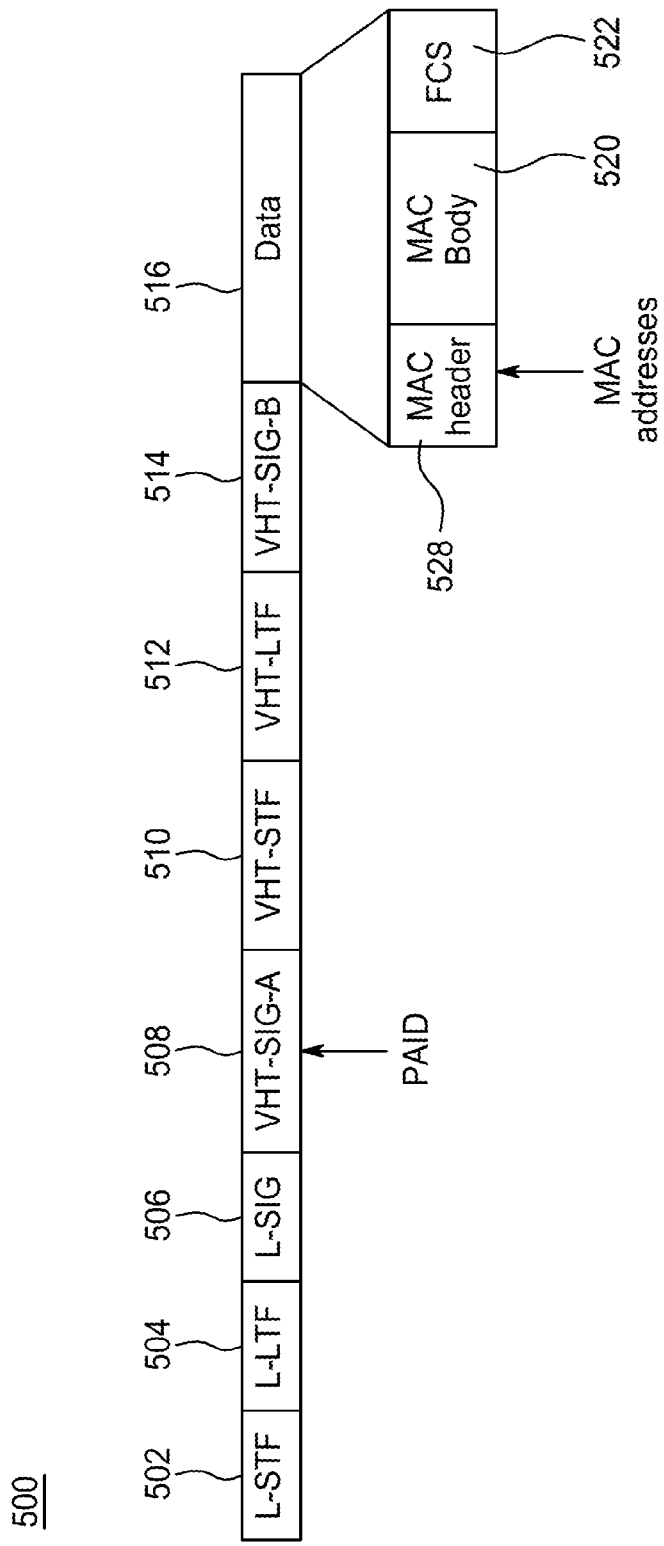
FIG. 5 is a diagram of another example of a VHT PPDU format.

FIG. 5 is a diagram of another example of a VHT PPDU format. FIG. 5 includes a L-STF 502, a L-LTF 504, an L-SIG 506, a VHT-SIG_A 508, a VHT-STF 510, a VHT-LTF 512, a VHT-SIG-B 514, and data 516. In an example in 802.11, the transmit MAC address (TA) and receive MAC address (RA) may be signaled in MAC header 528, which is modulated and coded together with the data field 516. Data field may also include mac body 520 and frame check sequence (FCS)_522. MAC addresses may be universally unique. Further, in an example in 802.11ac, a partial association identifier (PAID) (compressed from association identifier (AID) and BSS identifier (ID) (BSSID)) may be included in the VHT-SIG-A field to indicate the receiver ID for SU transmission. However, the PAID may not be unique.

FIG. 6 is a diagram of an example of a PAID as defined in 802.11ac. In an example in 802.11ac, the PAID may be set based on the table in FIG. 6 and be derived from the 48-bit BSSID and the 16-bit AID of the STA(s). In a further example, the PAID may include settings for the TXVECTOR parameters GROUP_ID and PARTIAL_AID. On a condition a PPDU is addressed to an AP with group_ID set to 0, the PAID may be defined according to bits 39 to 47 of the BSSID. On a condition a PPDU is addressed to a mesh STA with a group ID set to 0, a PAID may be defined according to bits 39 to 47 of the RA. On a condition the PPDU is sent by an AP and addressed to a STA associated with that AP or sent by a DLS or TDLS STA in a direct path to a DLS or TDLS peer STA with a group ID is set to 63, the PAID may be set based on bits 0 to 8 of the AID, bits 44 to 47 of the BSSID, and bits 40 to 43 of the BSSID.

FIG. 7 is a diagram of a PPDU format with a larger Fast Fourier Transform (FFT) size for data transmission. In an example, 802.11ax may consider a larger FFT size for data transmission. With reference to FIG. 7, the header portion of the PPDU has a 64 FFT size while the data portion is of size 256 FFT. This is in contrast to legacy 802.11 systems in which every OFDM symbol is modulated using 64 point IFFT.

FIG. 8 is a diagram of an example of a SIG field of a short preamble in 802.11ah. In an example, a SIG field of a short preamble may include several fields. Bit 0 may be reserved, bit 1 may be set to 1 if all spatial streams have an STBC coding and may be set to 0 if no spatial stream has an STBC coding. Bit 2 may be set to the value of the TXVECTOR parameter UPLINK INDICATION. Bits 3 and 4 may be set together as a decimal 0 for 2 MHz, a 1 for 4 MHz, a 2 for 8 MHz, and a 3 for 16 MHz. Bits 5 and 6 may be set together as a decimal 0 for 1 space time stream, a 1 for 2 space time streams, a 2 for 3 space time streams, and a 3 for 4 space time streams. Further, in an example in 802.11ah, bits B7 to B15 may contain the 9 bit PAID that is used to identify the receiver, for example, a STA, group of STAs, or an AP. The PAID may be a function of the BSSID of the AP in the case of an uplink transmission or a combination of the BSSID of the AP and the AID of the STA(s) in the case of a downlink transmission. Bit 16 may be set to 0 if a short guard interval is not used in the data field and set to 1 if a short guard interval is used in the data field. Bits 17 and 18 may be set together, wherein bit 17 may be set to 0 for BCC and a 1 for LDPC. If bit 17 is set to 1, bit 18 may be set to 1 if the LDPC PPDU encoding process of an SU PPDU results in one or more an extra OFDM symbol. Otherwise bit 18 may be set to 0. If bit 17 is set to 0, bit 18 may be reserved and set to 1. Bits 19 through 22 may be used for an MCS index. If bit 23 is set to 1, channel smoothing is recommended. If bit 23 is set to 0, channel smoothing is not recommended.

FIG. 9 is a diagram of an example of how a PAID may be used for Non-Data Packet (NDP) frames in 802.11ah. In an example, the PAID may include settings for the TXVECTOR parameters PARTIAL_AID for NDP frames. For a frame that is addressed to an AP, a PAID may be used based on bits 39 to 47 of the BSSID. A frame sent by an AP and addressed to a STA associated with that AP or sent by a DLS or TDLS STA in a direct path to a DLS or TDLS peer STA, or to a group of STAs with a common multicast AID and a common BSSID may be based on a PAID determined from bits 0 to 8 of the AID, bits 44 to 47 of the BSSID, and bits 40 to 43 of the BSSID. Otherwise the PAID may be set to 0.

FIG. 10 is a diagram of an example of a PAID for non-NDP and non-1 MHz PPDU frames in 802.11ah. In an example, the PAID may include settings for the TXVECTOR parameters PARTIAL_AID for non-NDP and non-1 MHz PPDU frames. The formula used may be different for NDP frames and non-NDP frames or 1 MHz PPDU frames as shown in FIGS. 9 and 10.

Figure 11:
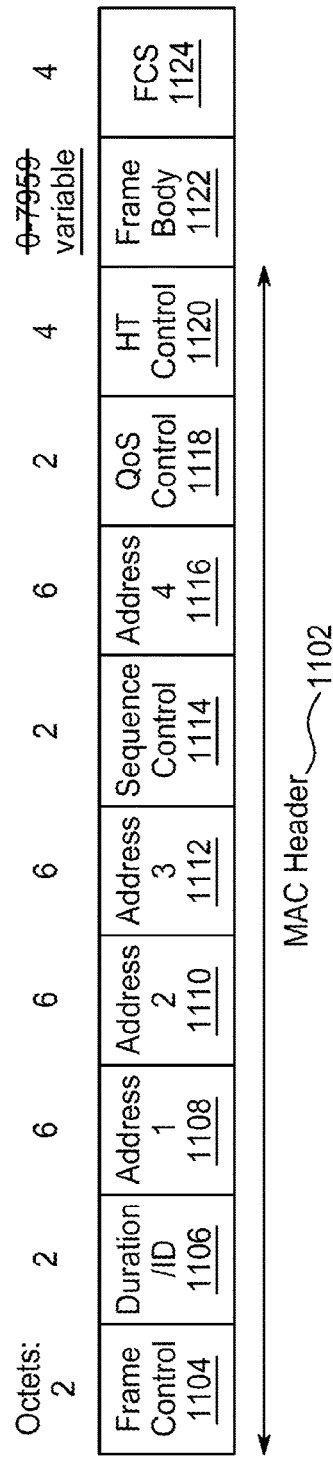
FIG. 11 is a diagram of an example of a media access control (MAC) frame format defined in 802.11ac.

FIG. 11 is a diagram of an example of a media access control (MAC) frame format defined in 802.11ac. In an example in current 802.11 standards, each frame is comprised of a MAC header 1102, a frame body 1122 and a FCS 1124 as shown in FIG. 11. The MAC header may contain several fields. The MAC header may contain a frame control field 1104, which may contain information such as Type, SubType, fragment and the like. The MAC header may also contain a duration/ID field 1106, which may contain the information (in the unit of microseconds) used for a NAV setting. In PS-Poll frames, the duration/ID field may be used to indicate the STA's AID. Further, the MAC header may contain a 1-4 address fields 1108 1110 1112 and 1116, which may contain up to four MAC addresses depending on the Type of the frame. Typically, address 1 may contain the receive address (RA) and is present in all frames. Address 2 may contain the TA and is present in all frames except ACK and CTS. Address 3 may be present in data and management frames. Address 4 may be only present in data frames and only when both the To DS and From DS bits are set. The MAC header may also contain a sequence control field 1114, which may contain a 4-bit fragment number and a 12-bit sequence number. Further, the MAC header may contain a QoS control field 1118, which may identify the traffic class (TC) or traffic stream (TS) and other QoS related information about the frame. This field may be present in QoS data frame. The MAC header may also contain an HT control field 1120, which may contain HT or VHT control information.

In an example, early packet determination may be supported. With current 802.11 MAC/PHY header designs, the PHY header may contain the basic information required by the PHY layer to detect and decode the packet. However, the transmitter and receiver of the packet may not be included in the PHY header. The PHY header may be modulated separately with the lowest modulation and coding scheme (MCS).

The MAC header, which includes the MAC address of the transmitter and the receiver, may be modulated and coded together with the MAC body, which means the receiver has to decode the entire packet in order to read the MAC header. Moreover, the MAC header and the MAC body may be encoded with the same MCS, which means the MAC header is not as reliable as the PHY header.

It may not be possible to determine the transmitter and receiver of the packet until the receiver decodes the entire packet, which brings several design defects to the system. Firstly, the system may not be power efficient since all the receivers have to listen to the entire packet. Secondly, the MAC header may be modulated and encoded with higher MCS, which makes the transmission of the MAC header not reliable enough. Thus, the receiver which failed to decode the MAC frame may not know the information carried in MAC header, including the identities of the transmitter and the receiver. This may be a main reason that there may not be a negative acknowledgement/repeat requested (NACK/NAK) design, an acknowledgement of not receiving the packet, implemented in 802.11 systems.

In an example, a longer symbol duration may be supported for the 802.11ax data portion. There may be more room to fully utilize the entire spectrum and design a more efficient and reliable packet headers.

The PAID may be a 9 bit field found in the SIG field of the preamble that identifies the receiving AP or non-AP STA and may enable early determination of the receiver of the packet without the need for decoding the MAC frame. It may be used in 802.11ac and 802.11ah and may be derived from the BSS ID in the case of the AP and a combination of the BSSID and STA AID in the case of a STA. In a dense network, there may be a problem in which the PAID calculated for different STAs may be identical. This may make it difficult for a STA to be uniquely identified. Methods to ensure that the PAID are unique may be needed.

Figure 12:
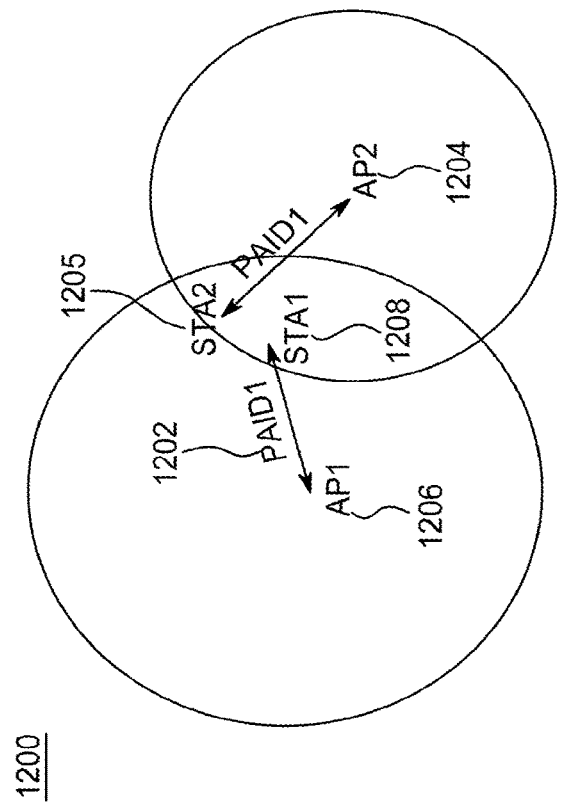
FIG. 12 is a diagram of an example of a PAID collision.

FIG. 12 is a diagram of an example of PAID collision. In an example, a PAID may be used for early determination of the receiver of the packet without the need for decoding the entire MAC frame. Further, an AID, which may be 16 bits, may be unique within one BSS but not unique in an Overlapping BSS (OBSS) scenario 1200. A PAID, which may be 9 bits, may be compressed from an AID and BSSID, and may not be unique even within a BSS. PAID collisions may happen, especially in an OBSS scenario. As shown in FIG. 12, the PAID1 1202 may be used for communication between AP1 1206 and STA1 1208 and PAID1 1202 may be used for communication between STA2 1205 and AP2 1202.

In a further example, different bandwidths may be supported. With current 802.11 PHY header designs, all the signaling fields, including L-SIG field, HT-SIG field, VHT-SIG-A/VHT-SIG-B fields, and S1G SIG/SIG-A/SIG-B fields, may be transmitted over the basic or smallest channel bandwidth. If the STA is operating on a channel which is wider than the basic or smallest channel bandwidth, the SIG field may be repeated on the rest of channels. For example, with 802.11ac, the VHT-SIG-A and VHT-SIG-B fields may be transmitted over the 20 MHz channel, and repeated on the rest of channels if needed. Thus, the wideband channel may not be fully utilized by the PHY signaling procedures and associated fields.

In an example, early packet determination may be supported. With IEEE 802.11n and 802.11ac standards, the DFT period may be defined as 3.2 us, and subcarrier spacing may be 312.5 kHz. While in 802.11ax, the following may apply. The data symbols in an HE PPDU may use a DFT period of 12.8 us and a subcarrier spacing of 78.125 kHz. Further, the data symbols in an HE PPDU may support guard interval durations of 0.8 us, 1.6 us and 3.2 us. Also, an HE PPDU may include the legacy preamble including L-STF, L-LTF and L-SIG fields, duplicated on each 20 MHz, for backward compatibility with legacy devices. In addition, an HE-SIG-A using a DFT period of 3.2 us and subcarrier spacing of 312.5 kHz may be duplicated on each 20 MHz channel, after the legacy preamble, to indicate common control information.

Figure 13:
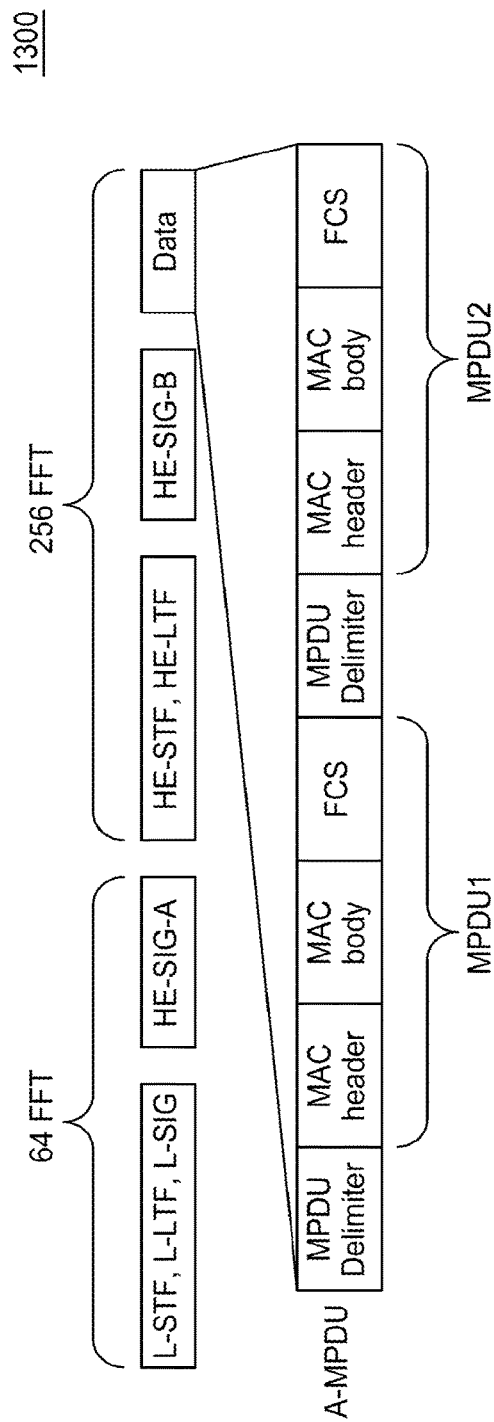
FIG. 13 is a diagram of exemplary frame designs.

FIG. 13 is a diagram of exemplary frame designs. Exemplary frame designs may include a PHY header, MAC header and MAC frames. In the following embodiments, a solution is provided that may move the receive address (RA) to the preamble using either a MAC address or a representation of the MAC address, which may include the PAID. This representation may be used to communicate the RA, the TA or a combination of both RA and TA. Further, examples and solutions disclosed herein may be extended to cover other FFT sizes, such as a 128 or 512 FFT size.

In an example, an accurate address/ID may be obtained by combining elements in both the SIG-A and SIG-B fields. The accurate address/ID may not be a universally unique address such as MAC address. However, it may be accurate enough that the collision probability of the addresses within a network is almost zero. In one embodiment, the PAID/Group ID may be placed in the SIG-Afield, while a newly defined ID may be placed in the SIG-B field. In this example, this field may be referred to as the PAID2 field. By combining the PAID/Group ID and the PAID2 field, a unique MAC address may be obtained even for scenarios where there may be PAID collisions.

For a downlink transmission with one or more STA(s) as a receiver, to represent the RA, or for an uplink transmission with one or more STA(s) as the transmitter, to represent the TA, the ID in the SIG-B or PAID2 field may be one of the following. The ID may be a function of the un-used AID bits in the current PAID formula (PAID2=f(AID[8:15]) for example, dec(AID[8-12])). Also, the ID may be a new function of the BSSID and the AID (PAID2=f(AID, BSSID)). Further, the ID may be a specific value that is set when a PAID collision is discovered. In this case, each time a new PAID value is estimated, the PAID2 may be set. In one example, it may be incremented by the AP and communicated to the STA(s).

Further, the ID in the SIG-B or PAID2 field may be conditionally assigned, for example, assigned only if a PAID collision occurs. In one embodiment, bit 23 in SIG-A may be set to 1 if the sub_PAID field is in use. In scenarios where there are no collisions, bit 23 may be set to zero.

For an uplink transmission with an AP as the receiver to represent the RA or a downlink transmission with the AP as the transmitter to represent the TA, additional unused bits of the BSSID may be used. As an example, in the four bit case: PAID2=f(BSSID(35:38)).

In another embodiment, a full MAC address of the AP may be derived from the combination of IDs in the SIG-A and SIG-B fields. For example PAID2 may be: PAID2= (BSSID[1:38]).

Figure 14:
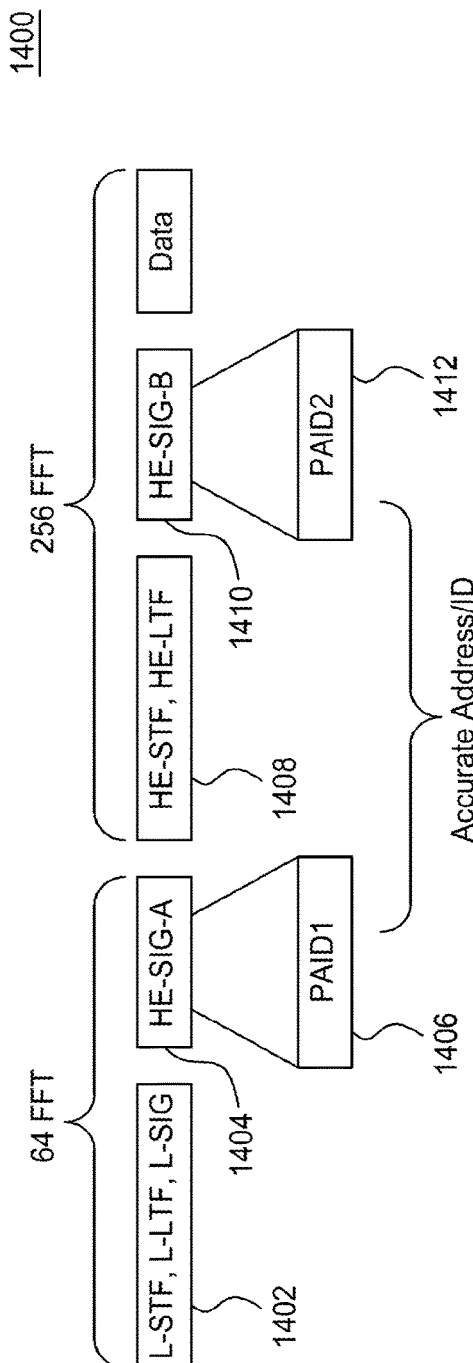
FIG. 14 is a diagram of an example of an identifier (ID) in a PLCP header.

FIG. 14 is a diagram of an example of an ID in a PLCP header. For example, a more accurate ID may include ID=function (PAID1 (SIG-A), PAID2 (SIG-B)).

An example procedure may be comprised of the following. A STA may start performing packet detection and decode the legacy preamble, including the L-STF, L-LTF and L-SIG fields 1402. The STA may decode HE-SIG-A field 1404 and obtain PAID/group ID information 1406. Further, the STA may compare its PAID/group ID with the detected PAID/group ID. If the STA has the same PAID or is within the group, the STA may be a potential receiver of the packet. Otherwise, the STA may not be the receiver of the packet. The STA may use the PAID1 to narrow the possible addresses, or group IDs, to a particular set, for example, set A. The STA may continue to decode the HE pre-amble 1408 and HE-SIG-B field 1410. The STA may obtain PAID2 1412. The STA may combine the PAID obtained from HE-SIG-A field and the PAID2 obtained from HE-SIG-B field. The STA may then accurately determine the address, or group ID, from the Set A.

In another example procedure, an accurate address/ID may be obtained by placing the entire AID in the SIG-B field with no ID defined in SIG-A. As the SIG-B field may be sent using a 256 pt FFT OFDM or similar transform, the size of the ID field in the SIG-B field may be large enough to limit the potential effect of collisions.

For representing a RA for a downlink transmission with one or more STA(s) as a receiver or to represent the TA of an uplink transmission with one or more STA(s) as a transmitter, more bits may be used from the STA(s) AID. In one embodiment, a 17 bit PAID may be used, allowing the entire 16 bit AID of the STA to be used in the PAID calculation as opposed to only the first 8 bits of the AID as used in the current calculation.

To represent the RA in an uplink transmission with an AP as the receiver or to represent the TA in a downlink transmission with the AP as the transmitter, more bits may also be used from the APs BSSID. In one embodiment, a 17 bit PAID may be used, allowing more of the 48 bit BSSID to be used in the PAID calculation with PAID=f(BSSID[30-47]).

Figure 15:
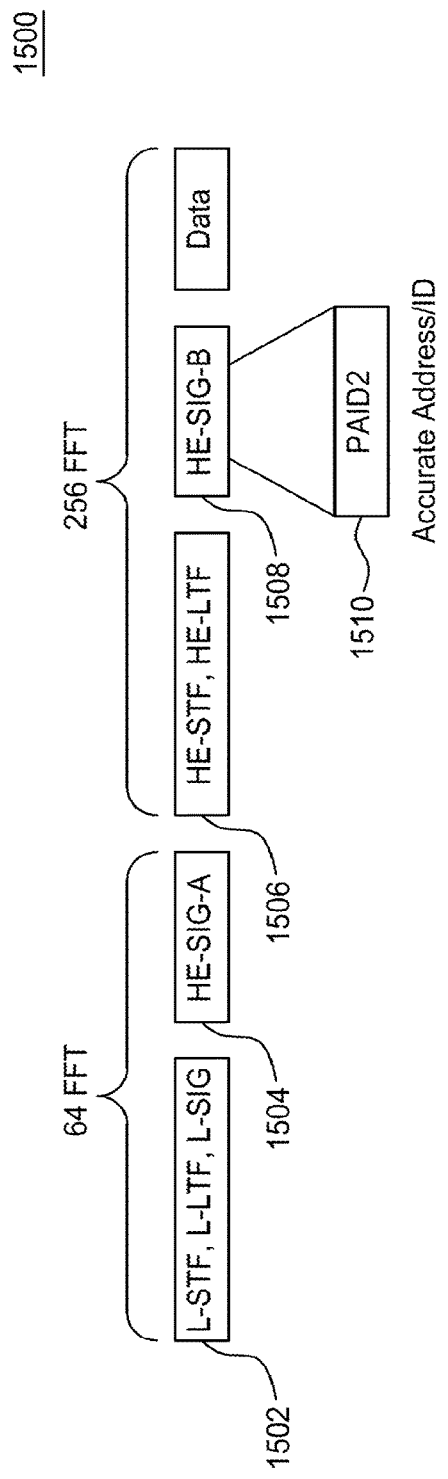
FIG. 15 is a diagram of another example of an ID in a PLCP header.

FIG. 15 is a diagram of another example of an ID in a PLCP header. Another example procedure may be comprised of the following. A STA may start performing packet detection and may decode the legacy preamble, including L-STF, L-LTF and L-SIG fields 1502. The STA may decode the HE-SIG-A field 1504. The STA may continue to decode the HE pre-amble 1506 and HE-SIG-B field 1508. The STA may obtain PAID2 1510. Further, PAID2 1510 may contain accurate address information for the STA to determine the transmitter and/or the receiver of the packet 1500.

Figure 16:
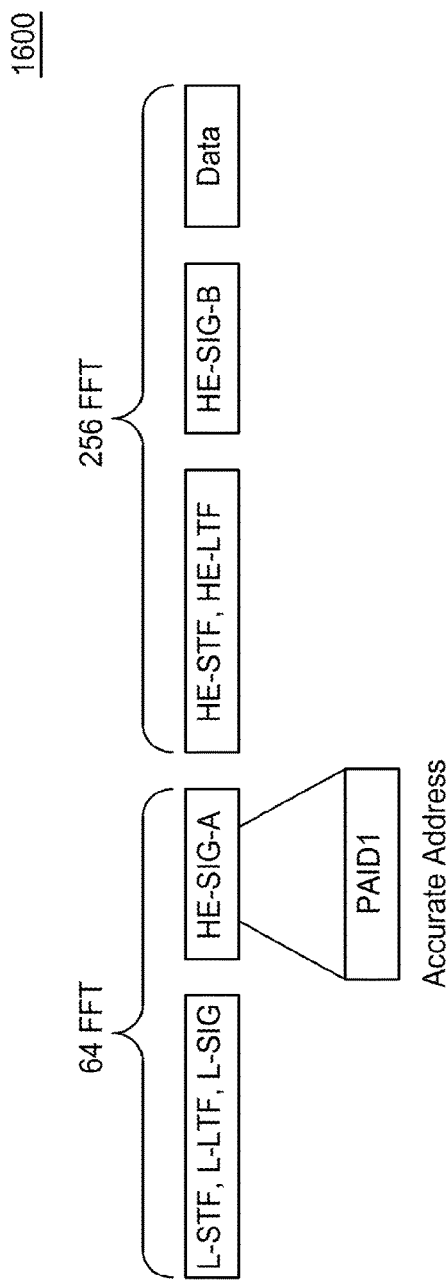
FIG. 16 is a diagram of yet another example of an ID in a PLCP header.

FIG. 16 is a diagram of yet another example of an ID in a PLCP header. In an example procedure, an accurate address/ID may be created by placing the entire AID in the SIG-A field alone with no ID defined in the SIG-B field. In this case, to limit the effect of collisions one of the following approaches may be used. For example, the number of bits allocated to the PAID field may be increased. The PAID field may contain an accurate address for identification of a transmitter and/or receiver of the packet 1600.

Also, multiple sets of equations may be created to be used to set the PAID field. Each set of PAID equations may be created to limit overlap with the other sets. To create multiple sets of equations, a different set of bits may be used within the BSSID and/or AID to create the PAID field. Also, same set of equations may be used to create the PAID field but modulate the resulting PAID field using orthogonal or semi-orthogonal codes. To ensure that the equation used is known at the transmitter, a bit or set of bits may be set indicating the specific equation set used. This may be set in SIG-A for example using the reserved bit. Alternatively, in a hybrid approach with a combined PAID in HE-SIG-A and HE-SIG-B fields, the specific equation set used may be communicated in SIG-B. In an example, the use of the alternate equation(s) may be triggered only if a collision is detected.

An example procedure may be comprised of the following. A STA may perform start of packet detection and decode the legacy preamble, including L-STF, L-LTF and L-SIG field. Further, the STA may decode the HE-SIG-A field and obtain PAID1. Also, the STA may then accurately determine the address, or group ID, according PAID1.

In a further example for 802.11ac using downlink MU-MIMO, the group ID may be included in the SIG-A field, and PAID may not be used. In this procedure, the group ID may be included in the HE-SIG-A field, and a version of AID may be present in the HE-SIG-B field.

Using downlink MU transmission, the group ID and/or BSS color field may be included in the HE-SIG-A field. In an alternative method, the group ID may be omitted. Further, with DL OFDMA transmission, the HE-SIG-B field may be separately coded and modulated on the sub-channel allocated to each STA/user. The HE-SIG-B field carried by one sub-channel may contain an AID. The STA with the corresponding AID may be allocated to that sub-channel.

Using uplink MU transmission, the group ID and/or BSS color field may be included in the HE-SIG-A field. The same or common HE-SIG-A field may be transmitted by all the uplink simultaneous STAs. In an alternative method, instead of BSS color, the full BSSID or a partial BSSID may be included in the HE-SIG-Afield. Further, using UL OFDMA transmissions, an alternative method and procedure may be applied. Each uplink STA may form the HE-SIG-A field on the entire channel, but only transmit the signals on assigned sub-channel(s), and transmit nothing on the unassigned sub-channels.

Using uplink OFDMA transmission, each STA may send a HE-SIG-B field on its assigned sub-channel(s). The STA may include its AID in the HE-SIG-B field on assigned sub-channel(s). Each STA may have its own HE-SIG-B field.

Further, using uplink MU-MIMO transmission, each STA may send a HE-SIG-B field on the entire bandwidth. The STA may include the AID in the HE-SIG-B field. Each STA may have a common HE-SIG-B field.

In a further example, a procedure for receiving and processing uplink MU transmissions at a STA may be comprised of the following. A STA may perform the start of packet detection and decode the legacy preamble, including the L-STF, L-LTF and L-SIG fields. Further, the STA may decode an HE-SIG-A field and obtain a direction bit, BSS color and/or group ID. The STA may determine the packet is for uplink multi-user transmission. A non-AP STA may determine the uplink transmission, and it may not be the receiver of the packet. Further, an AP STA may compare its BSS color with the detected BSS color and determine whether it is a potential receiver. In another example, if a part of or the full BSSID is included, an AP STA may more accurately determine whether it a potential receiver. Also, the STA may continue to decode the HE preamble and HE-SIG-B field on all the sub-channels. The STA may obtain multiple AIDs. An AP STA, which may be the potential receiver of the transmission, may compare the received AIDs with the group ID. If all the AIDs corresponding to the users are identified by the group ID, the AP may then accurately determine it may be the receiver of the transmission. In an example, the determination may be based on all the information obtained from BSS color/partial BSSID, group ID, and AIDs.

In a further example, a procedure for receiving and processing DL OFDMA transmissions at a STA may be comprised of the following. A STA may perform the start of packet detection and decode the legacy preamble, including the L-STF, L-LTF and L-SIG fields. Further, the STA may decode the HE-SIG-A field and obtain the BSS color and group ID. The STA may determine that the packet is for DL OFDMA transmission. Also, the STA may compare its BSS color and group ID with the detected BSS color and group ID. If the STA has the same BSS color and is part of the group, the STA may be a potential receiver of the packet. Otherwise, the STA may not be the receiver of the packet. The STA may use the BSS color and group ID to narrow the possible number of addresses of the receiver or receiver group, to a particular set, for example, Set A. In addition, the STA may continue decode the HE preamble and HE-SIG-B field on all the sub-channels. The STA may obtain multiple AIDs. Further, the STA may compare its AID with the obtained AIDs. If the STA's AID is carried on certain sub-channel(s), the STA may be a receiver of the OFDMA transmission and sub-channels assigned to the STA may be the sub-channels which carries the AID. The STA may then accurately determine the address, or group ID, from a particular set, for example, the Set A.

In a further example, in 802.11ac and related specifications, the MAC address of the transmitter (TA) and receiver (RA) may be carried in the MAC header. The MAC address may be a unique ID for a STA, which contains 6 octets. With the longer symbol duration discussed in 802.11ax, the SIG-B field, which may be one OFDM symbol, may be able to carry one or more MAC addresses.

In one example method, the RA may be included in the SIG-B field. In another example method, both the RA and TA may be included in the SIG-B field. In a third example method, a compressed version of RA and TA may be included in the SIG-B field. The compressed version of RA and TA may be a function of both RA and TA. For example, a bitwise operation, such as OR, XOR, AND, may be used to combine RA and TA. Further, a modulo operation may be applied to the function.

In a fourth example method, the RA and TA may or may not be presented in SIG-B field depending on the parameter settings in SIG-A field, or the rest of SIG-B field, or a combination of SIG-A and SIG-B fields. For example, for a responding frame, which may be transmitted following a previous transmission without contention, RA may be present. As a further example, for an initiating frame, which may be transmitted by a STA which contended and acquired the channel, both the RA and TA may be present. As another example, to differentiate a responding frame and an initiating frame, one bit may be utilized explicitly in one of signaling field in the PLCP header. This bit may be referred to as the responding bit or other terminology. Alternatively or in combination, an implicit signaling method may be applied.

In an example, since one or more MAC addresses may be moved to the PLCP header and the MAC header may be modified accordingly. The RA field may not be present in the MAC header, and the TA field may be optionally present in the MAC header.

An example procedure for the fourth method, above, may be comprised of the following. A STA may perform start of packet detection and decode the legacy preamble, including the L-STF, L-LTF and L-SIG fields. Further, the STA may decode HE-SIG-A field and obtain the responding bit.

For a responding frame, the STA may determine whether it is part of the transmission by checking whether it sent the previous frame to which the responding frame responded. Also, the STA may continue decoding the HE preamble and HE-SIG-B field. The STA may also obtain the RA field. By checking the RA field, the STA may determine whether it is the receiver of the transmission. If it is the receiver, by checking the previous frame the responding frame responded, the STA may determine the transmitter of the current frame.

For an initiating frame, the STA may continue decoding the HE preamble and HE-SIG-B. According to the RA and TA field in HE-SIG, the STA may uniquely determine the transmitter and receiver of the frame.

In a further example, the AP/STAs may use signaling and a procedure for PAID discovery. In this embodiment, a procedure may be defined to enable the Partial AID of a STA, AP or set of STAs to be discovered by the network. AP/STAs may use this procedure to make sure that the PAID values associated with a specific node are accurate. This may be necessary in scenarios where PAID collision may occur such as a dense network with OBSSs where the density of APs and STAs may result in the same PAID being assigned to multiple STAs.

In an example, a PAID discovery procedure may be initiated fora specific PAID as follows. A PAID discovery request frame may be sent to enable an AP or STA find out the MAC address associated with a specific PAID. Further, all STAs that are identified with the sent out with the PAID may reply with a PAID response frame that includes the PAID requested for and an associated MAC address. In an example, the PAID response frame may be aggregated with other MAC frames. In another embodiment, a global PAID request frame may request that all STAs associated with a BSS reply with their PAID and corresponding MAC address. In the event that there are multiple STAs that reply to the PAID request, a PAID collision mitigation procedure may be initiated.

In a further example, the PAID request frame may be transmitted from an AP to STA or vice versa. Further, the PAID request frame may be broadcast from an AP to request that all STAs send their information in to be checked for duplicates. Also, the PAID request frame may be a request to a specific PAID so that all STAs with colliding PAIDs send their information in.

Figure 17:
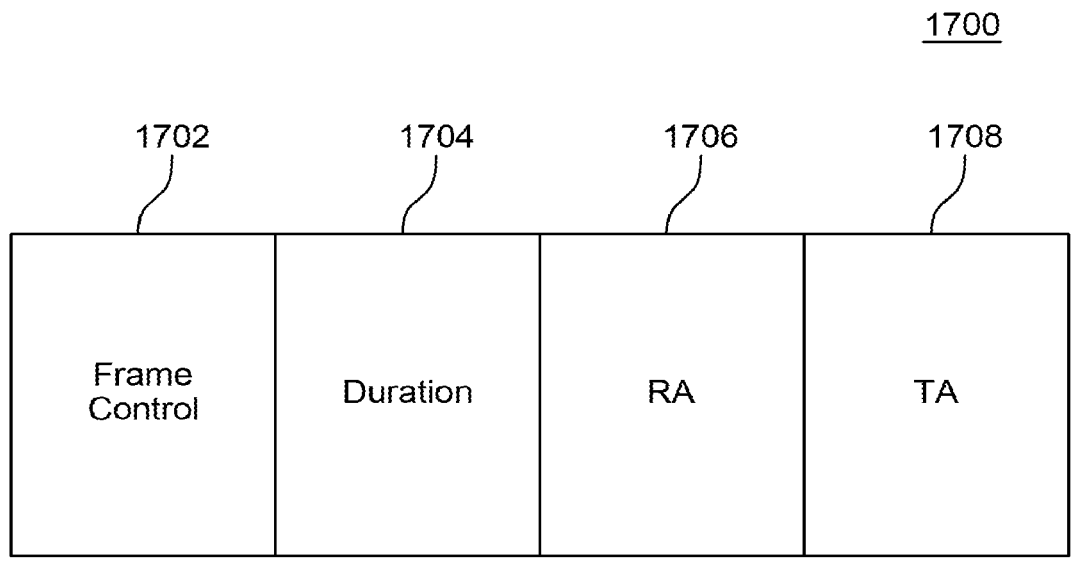
FIG. 17 is a diagram of an example of a PAID discovery request frame.

FIG. 17 is a diagram of an example of a PAID discovery request frame 1700. The exemplary PAID discovery request frame 1700 is comprised of a frame control field 1702, a duration field 1704, an RA field 1706, and a TA field 1708.

Figure 18:
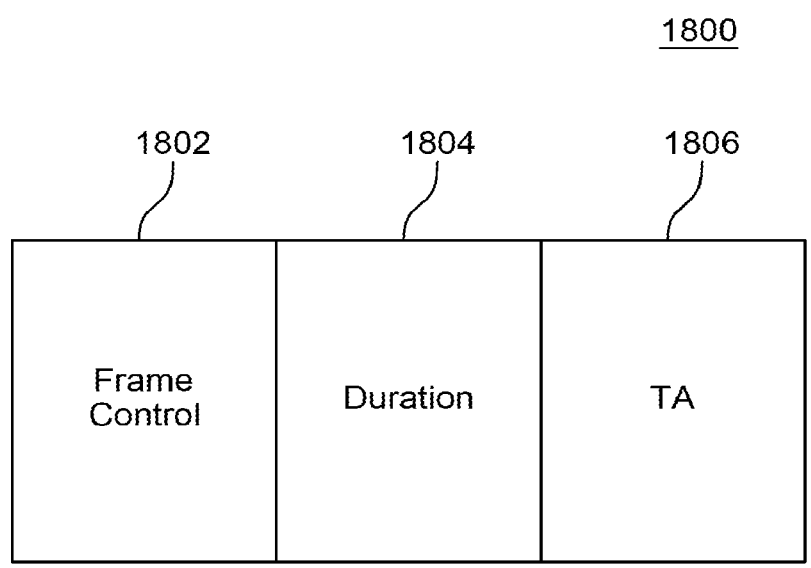
FIG. 18 is a diagram of an example of a global PAID discovery request frame.

FIG. 18 is a diagram of an example of a global PAID discovery request frame 1800. The exemplary global PAID discovery request frame 1800 is shown comprised of a frame control field 1802, a duration field 1804, and a TA field 1806.

Figure 19:
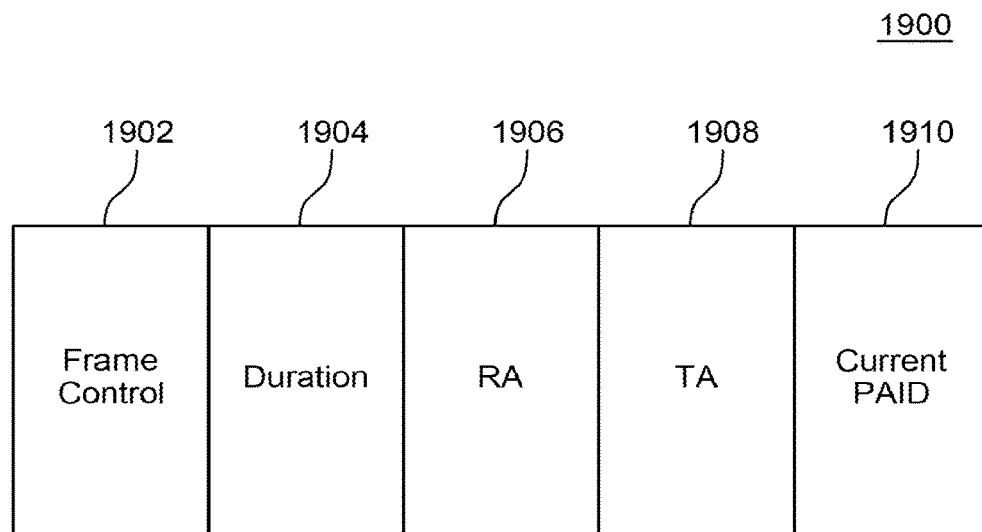
FIG. 19 is a diagram of an example of a PAID discovery response frame.

FIG. 19 is a diagram of an example of a PAID discovery response frame 1900. The exemplary PAID discovery response frame 1900 is shown comprised of a frame control field 1902, a duration field 1904, an RA field 1906, a TA field 1908, and a current PAID field 1910.

In a further example, an AP/STA may use a procedure to assign a new PAID triggered by collision detection. In dense network scenarios, there may be multiple STAs identified using the same PAID. In single BSS scenarios, this condition may be identified by the AP. In this case, the AP may decide to assign a new AID to the STA or may decide to change the PAID address using a different PAID address methodology as discussed above. This may occur during the STA association process.

Figure 20:
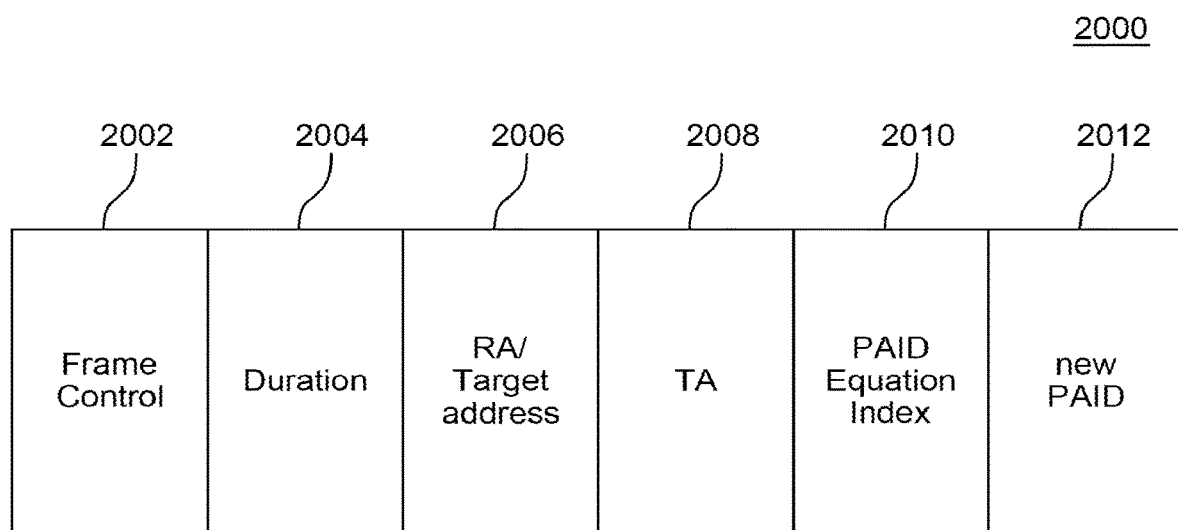
FIG. 20 is a diagram of an example of a PAID change frame during association response.

FIG. 20 is a diagram of an example of a PAID change frame 2000 which may be used during an association response. The PAID change frame may support early packet detection and be used in association procedures. Exemplary PAID change frame 2000 is shown comprised of a frame control field 2002, a duration field 2004, an RA/target address 2006, a TA field 2008, a PAID equation index field 2010, and a new PAID field 2012.

Figure 21:
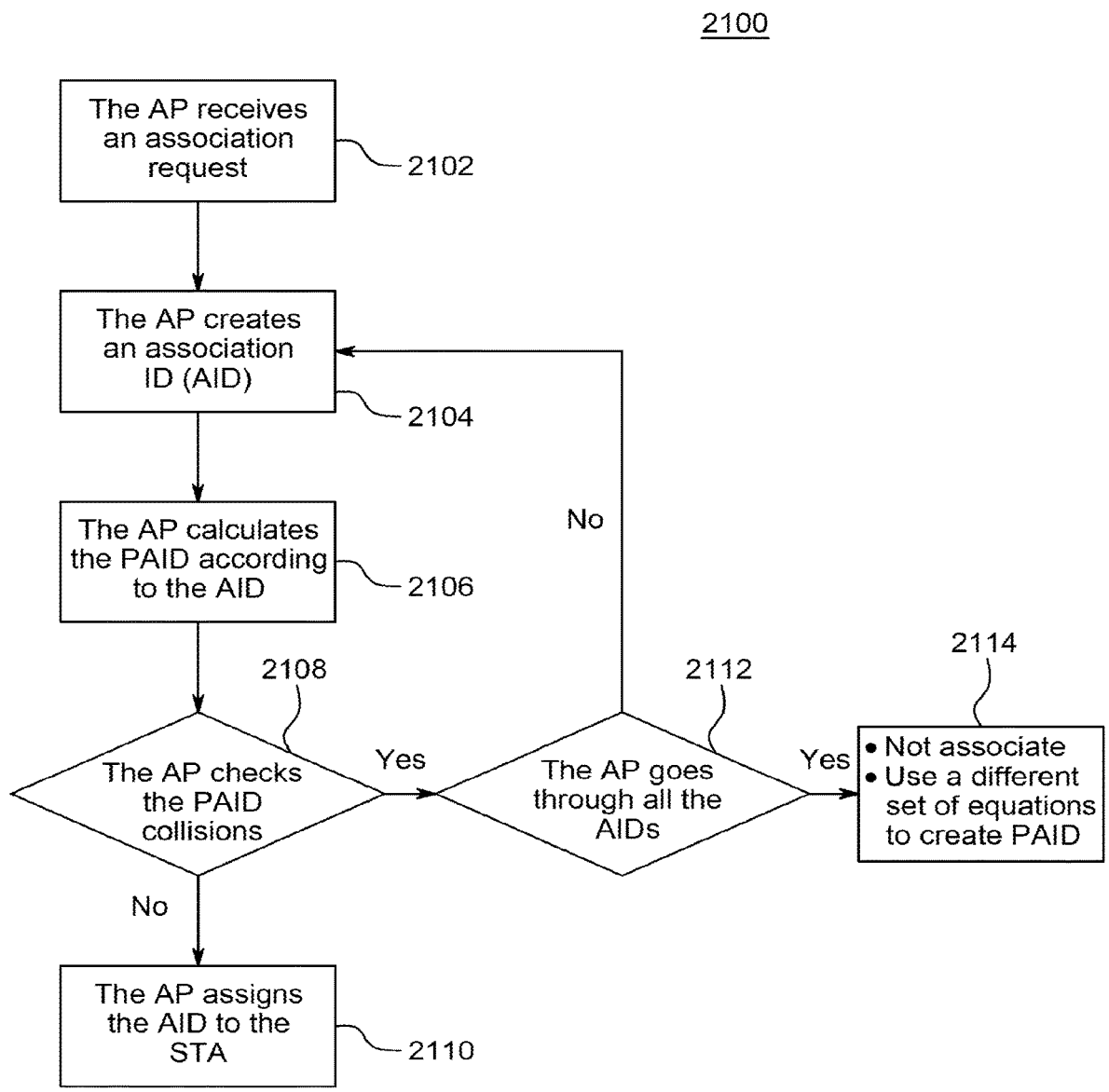
FIG. 21 is a diagram of an example of an association procedure with PAID collision aware AID assignment.

FIG. 21 is a diagram of an example of an association procedure with PAID collision aware AID assignment. The following example association procedure may be used. When a STA decides which AP it would like to be associated with, the STA may send an association request to the AP. The AP may receive the association request 2102 and create an AID for the STA 2104. In an example, the AP may also calculate the PAID according to the AID 2106. The AP may check the PAID estimated based on the AID to ensure that there are no PAID collisions 2108. If there are no PAID collisions, the AP may send an Association Response frame to the STA. In an example, the AP may assign the AID to the STA 2110. If there are PAID collisions, the AP may cycle through all possible Association IDs to find one which avoids collisions 2112 and then send an Association Response to the STA. If the AP is unable to find a non-colliding AID, the AP may not associate with the STA 2114. Also, the AP may use a different set of equations to create the PAID field, as discussed above. The AP may then send an Association Response to the STA. The AP may also send a PAID change frame or similar frame to indicate the use of a different PAID estimation equation. For example, the AP may use the PAID equation index field 2010 of FIG. 20 and/or alternatively, a specific PAID address as shown in the new or modified PAID field 2012 of FIG. 20.

FIG. 22 is a diagram of an example of a PAID change frame 2200. In scenarios in which multiple BSS are within range and are overlapping, this overlapping condition may be identified by the procedure disclosed above. PAID change frame 2200 includes, for example, a frame control field 2202, a duration field 2204, a RA/target address field 2206, a TA field 2208, a current PAID field 2210, and a new PAID field 2212. The length of a STAID or PAID may vary. In 802.11ax the STAID was changed from 8 bits to 11 bits. Current PAID field 2210 or new PAID field 2212 may carry a STAID.

On discovery of a PAID collision, an AP may mitigate the effect of collisions by implementing the following example procedure. The AP may detect the PAID problem above and may estimate a new PAID to send. Further, the AP may send the suggested PAIDs to STA with a MAC frame containing the old PAID, the new PAID and MAC address of STA that a change is desired for. An example of a PAID change frame which may be utilized is shown in FIG. 22.

Further, the STA may send back an ACK to indicate that the change has occurred. The ACK may include the new PAID value or its corresponding MAC address or both.

In order to support early detection, it may be possible to move some information which may otherwise be carried in the MAC header to the SIG field, for example, the HE-SIG-B field. The information mentioned above may include MAC addresses, the duration field and the like. The duration field may be used for unintended STAs, to set NAV accordingly.

Support for multi-bandwidth transmission may be provided. In an example, modified methods and procedures to encode and transmit signal fields are disclosed. As used herein, a sub-channel may refer to the smallest frequency resource a STA may be allocated. A minimum sub-channel bandwidth may not be specified in 802.11ac or related specifications. A minimum sub-channel bandwidth may be restricted to a set of allowed bandwidths, for example, 1, 2, 5, 10 and/or 20 MHz and the like.

A basic channel may refer to a smallest frequency resource that may be assigned to an individual STA. In the 802.11ac specification this may not be less than 20 MHz. In this embodiment the smallest allowed frequency resource may be smaller and/or larger than this. Usually, the basic channel is the smallest channel which may be used to transmit a full version of the L-STF/L-LTF/L-SIG and SIG-A fields. As noted for 802.11ac, the basic channel may refer to a 20 MHz bandwidth (BW) channel.

A sub-channel may have the same size as the basic channel. Or a sub-channel may have a narrower BW than the basic channel. In the second scenario, an OFDMA transmission may be possible on a basic channel.

Next generation HE WLAN systems may support multiple user transmissions, such as OFDMA, for both downlink and uplink. An extension to the existing 802.11 systems may be to utilize the basic or smallest possible channel bandwidth as the preferred OFDMA sub-channel bandwidth. For example, the OFDMA sub-channel bandwidth on 2.4 GHz/5 GHz bands may be 20 MHz or even smaller.

FIG. 23 is a diagram of examples of allocations of sub-channels and basic channels. As shown in FIG. 23A, the bandwidth of a sub-channel allocated to a user may have a different bandwidth at different times. It should be noted that with reference to FIG. 23, bandwidth is expressed in terms of frequency in the y axis and time is expressed by the x axis. For example, user 1 data 2302 is roughly twice the size of user 1 data 2304 at a different time instance. The same is true for user 2 data 2306 and user 2 data 2308.

FIG. 23B illustrates that for different users, at the same instant in time, the bandwidths allocated may be different. User 1 data 2310 is shown in a narrower sub-channel than user 2 data 2312 and user 2 data 2312 is shown in a narrower sub-channel than user 3 data 2314.

FIG. 23C shows an example of how multiple sub-channels may also be allocated to a STA either contiguously or non-contiguously. Sub-channels for user 1 data 2316 and user 1 data 2320 are shown interspersed with sub-channels for user 2 data 2318 and user 2 data 2322. Since OFDMA like transmissions may not be defined, the MAC/PHY procedures, and associated signaling for sub-channels, for example, smaller than 20 MHz, may not be supported.

In an example, STA1 may acquire the channel, and transmit a packet to STA2 on one or more sub-channels. The transmission may represent a single user transmission where STA1 may transmit a packet to STA2 using possible acquired sub-channels. Further, the transmission may be part of a MU transmission. In a DL MU transmission scenario, STA1 may represent an AP and STA2 may represent a non AP STA. STA1 may acquire multiple sub-channels, and transmit to multiple users, including STA2 simultaneously. STA1 may assign one or more sub-channels to STA2.

In an uplink MU transmission scenario, STA1 may represent a non AP STA, and STA2 may represent an AP. STA1, together with other non AP STAs may transmit to STA2 using uplink MU transmission. STA1 may use one or multiple sub-channels.

In an example, spectral unequal coding may be utilized to encode signaling information across multiple sub-channels, for example, the HE-SIG-B field. Each sub-channel may have a variable granularity that represents the entire information field, wherein the granularity may enable a low overhead.

Figure 24:
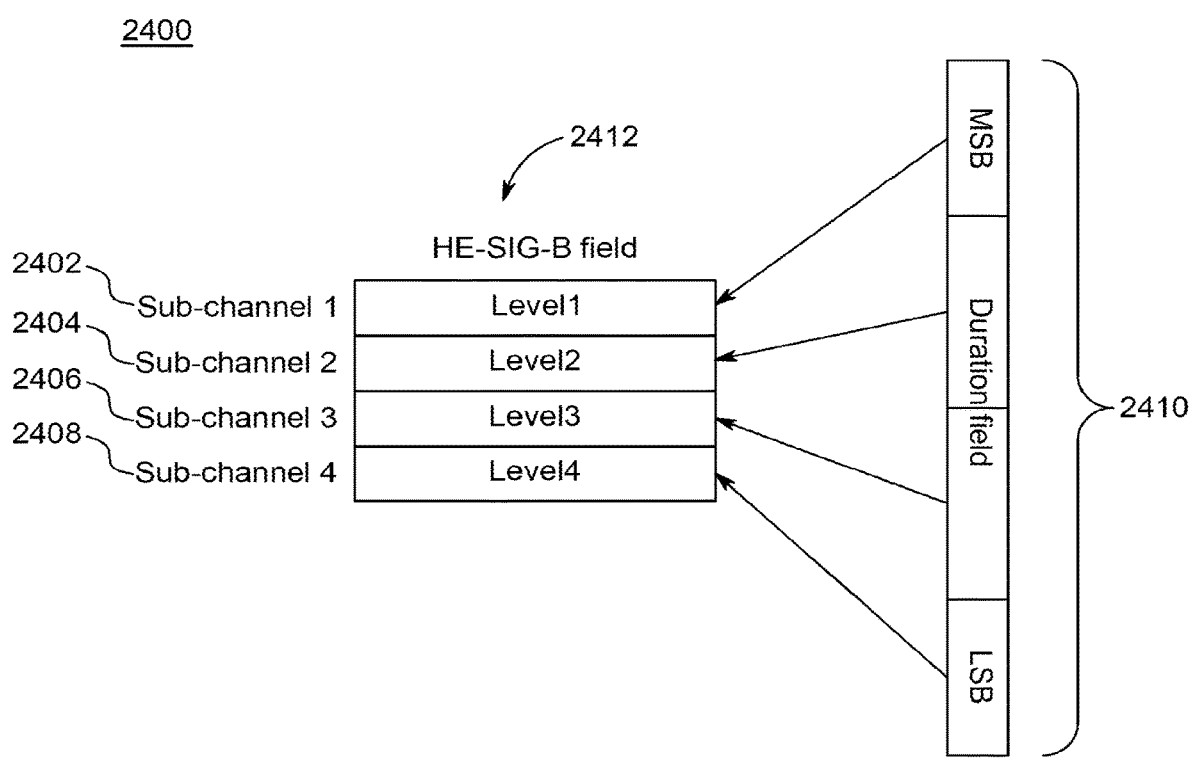
FIG. 24 is a diagram of an example of multi-resolution coding of a duration field on 4 sub-channels.

FIG. 24 is a diagram of an example of multi-resolution coding of a duration field 2410 on 4 sub-channels 2402-2408. In an example, a duration field 2410 may be included in the HE-SIG-B field 2412. The HE-SIG-B field 2412 may be carried on M sub-channels 2402-2408. In this example, the communication between a pair of STAs, for example, STA1 and STA2, may be allocated to M sub-channels. The duration field may need to use N bits to be represented. The duration field may be divided into M pieces and the first M−1 pieces may contain ceiling(N/M) bits each. And the last pieces may contain N-ceiling(N/M)*(M−1) bits. The HE-SIG-B field of the first sub-channel may carry the first piece, i.e. ceiling(N/M) most significant bit (MSB) of the duration field 2410. The HE-SIG-B field of the second sub-channel may carry the second piece and so on, as shown in FIG. 24.

Figure 25A:
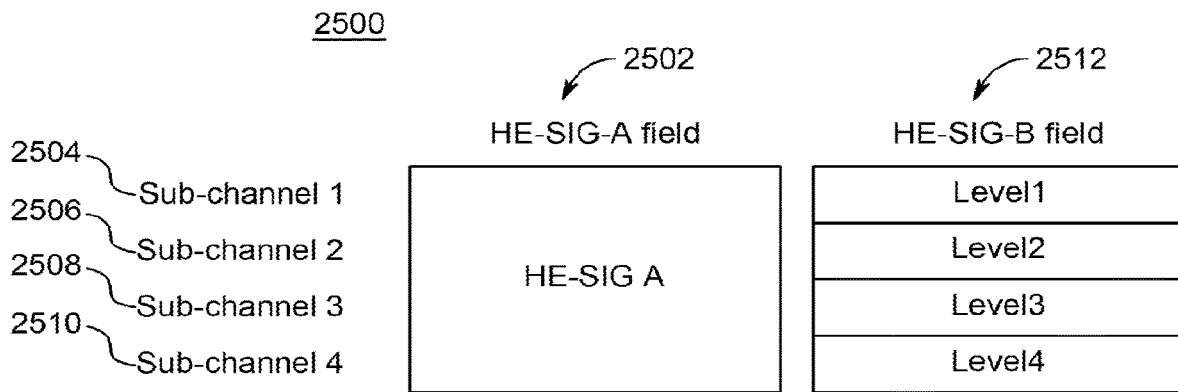
FIG. 25A is a diagram of an example SIG design for spectral unequal coding for signal fields.

FIG. 25 is a diagram of example SIG designs for spectral unequal coding for signal fields. In FIG. 25A, a common signal field, HE-SIG-A field 2502, may be coded and modulated on a channel. This channel may be further divided to multiple sub-channels, which may be assigned to one or multiple users. In this example, the channel may be divided into four sub-channels 2504-2510 and assigned to one user. The second signal field, e.g., HE-SIG-B field 2512, may be coded and modulated on the assigned sub-channels using spectral unequal coding procedures.

Figure 25B:
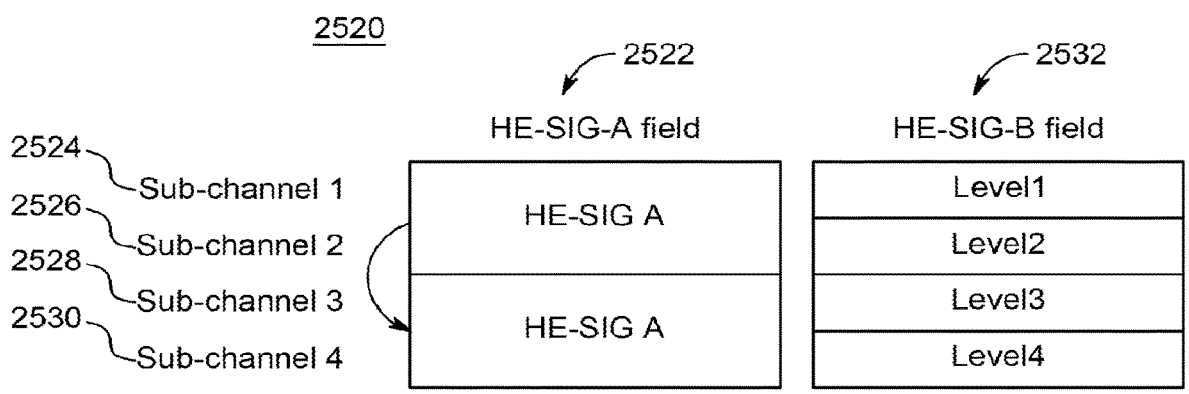
FIG. 25B is another example diagram of an example SIG design for spectral unequal coding for signal fields in which a HE-SIG-A field, may be coded and modulated on a basic channel and repeated on the other acquired channels.

FIG. 25B, shows another example. A common signal field, for example, the HE-SIG-A field 2522, may be coded and modulated on a basic channel, and repeated on the other acquired channels. Some of the sub-channels may be assigned to one user. In this example, a basic channel may contain 2 sub-channels, for example sub-channel 1 2524 and sub-channel 2 2526 or sub-channel 3 2528 and sub-channel 4 2530. The 4 sub-channels may be assigned to a STA. The second signal field, for example, the HE-SIG-B field 2532, may be coded and modulated on the assigned sub-channels using spectral unequal coding procedures.

Figure 25C:
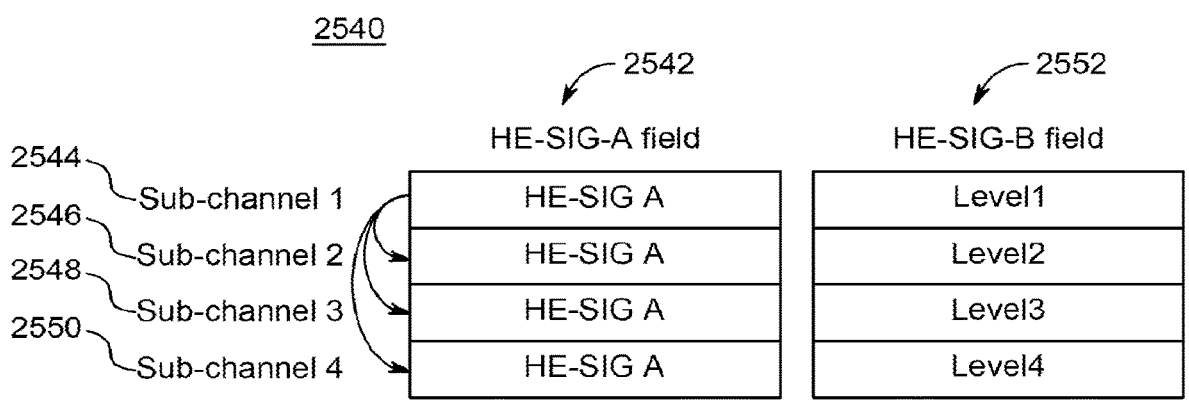
FIG. 25C is a third example diagram of an example SIG design for spectral unequal coding for signal fields in which a basic channel may contain one sub-channel.

FIG. 25C shows a third example. In this example a basic channel may contain one sub-channel. A common signal field, for example, HE-SIG-A field 2542, may be coded and modulated on a basic channel. Four sub-channels 2544-2550 may be assigned to a STA. The second signal field, for example, HE-SIG-B field 2552, may be coded and modulated on the assigned sub-channels using spectral unequal coding procedures.

In an embodiment, a STA referred to as STA1, as a transmitter, may follow an example procedure. STA1 may determine the number of sub-channels assigned or available for STA2, and denote the number as M. Further, STA1 may include M in one of its common signal fields. For example, it may include M in the HE-SIG-A field. M may be signaled as the number of sub-channels directly, or using bandwidth field and/or other fields. Also, STA1 may begin spectral unequal coding on a second signal field, for example HE-SIG-B field, which may introduce different HE-SIG-B fields from one sub-channel to another. As used herein, the SIG-B field on sub-channel k may be referred to as level k information. There may be increasingly fine granularity from level 1 to level M. The second signal field may contain information such as duration, packet length, STA IDs and the like. Level1 information may be transmitted on the first sub-channel and considered as the base information, or the information with the coarsest granularity. Level2 information may be transmitted on the second sub-channel and considered as an extension to level1 information, or the information with the finer granularity. Level M information may be contained on the Mth sub-channel. This may contain the last resolution signal information or the finest information. In an example, the mapping between sub-channels and the granularity levels may depend on the channel qualities of sub-channels for high reliability.

In an embodiment, a STA referred to as STA2, as an intended receiver, may follow an example procedure. STA2 may determine the number of sub-channels assigned or available (M) by checking the common signal field. For example, it may check the HE-SIG-A field. M may be signaled as the number of sub-channels directly, or using bandwidth field, and/or other fields.

Further, STA2 may begin spectral unequal decoding on a second signal field, for example the HE-SIG-B field. The decoding procedure may be performed on sub-channels in order. The first level may be obtained on the first sub-channel. STA2 may obtain coarse information by detecting and decoding the first level signal alone. The second level signal information may be obtained on the second sub-channel. The second resolution signal information may be considered as an extension to the first level information, or the information with the finer granularity, where a receiver may combine the first and second level information to obtain a finer or more accurate information than the first level information. The Mth level signal information may be obtained on the Mth sub-channel. This may contain the last level signal information or the finest information. By combining all the information from the M levels, the receiver may obtain the full information.

Unintended STAs may follow an example procedure. An unintended STA may determine the number of sub-channels assigned or available, M, by checking the common signal field. For example, it may check the HE-SIG-A field. M may be signaled as the number of sub-channels directly, or using bandwidth field, and/or other fields. Depending on the capability of the unintended STA, it may perform decoding of the second signal field on some sub-channels. The STA may decode the signal information on the first sub-channel. If the information contained in this SIG field is enough for the receiver to determine if the packet is not for the receiver, through unintended receiver detection, or the NAV setting for the receiver, then the receiver may stop decoding procedure and set NAV accordingly. Otherwise it may continue decoding procedure on the second sub-channel. The STA may continue the similar decoding procedure until it obtains enough information.

As used herein, one of ordinary skill in the art will appreciate and understand that a STA referred to herein may also be a STA utilized as a relay.

Figure 26:
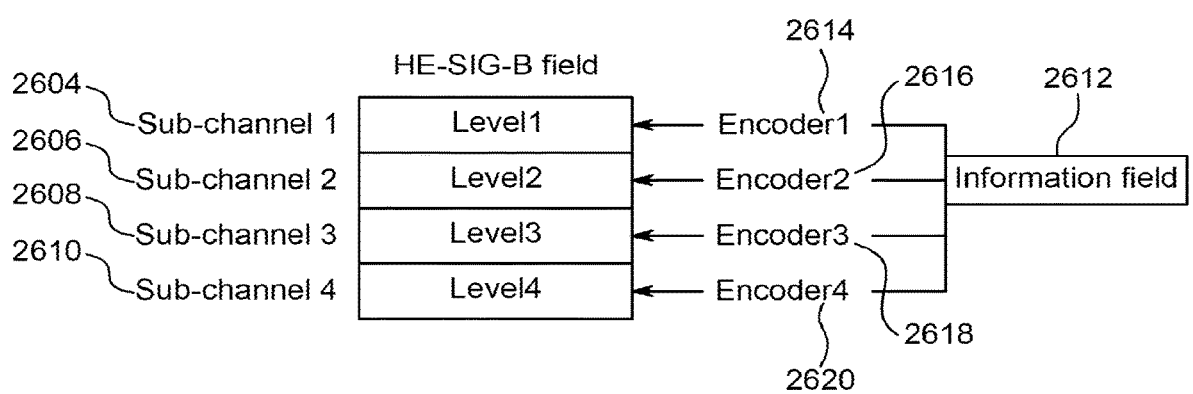
FIG. 26 is a diagram of an example of spectral unequal coding utilized to encode SIG information on multiple sub-channels.

FIG. 26 is a diagram of an example of spectral unequal coding. In an example, self-contained spectral unequal coding may be utilized to encode SIG information on multiple sub-channels, for example, the HE-SIG-B field 2602. Each sub-channel 2604-2610 may have a self-contained version of the entire information field 2612 which may be used to facilitate the recovery all of the signal information elements.

For example, an information field 2612 may be included in the HE-SIG-B field 2602. The information field may contain a duration field, STA IDs, packet length, and the like. The HE-SIG-B field may be carried on M sub-channels 2604-2610. In this example, the communication between STA1 and STA2 may be allocated to M sub-channels. The information field may be encoded by M different encoders 2614-2620. The encoders may or may not be the same. The coding rates of each one of the encoders may or may not be the same. The coding rates of the encoders may be different from the coding rate used for other signal fields, such as HE-SIG-A.

In another example method, the information field may be modulated and coded with different MCSs on different sub-channels. The transmitter, STA1, may assign MCSs for the sub-channels. The MCS assignment may consider the sub-channel conditions. The MCSs for HE-SIG-B field may be signaled in HE-SIG-A field.

STA1, as a transmitter, may follow an example procedure. STA1 may determine the number of sub-channels assigned or available for STA2, and denoted it as M. Further, STA1 may include M in one of its common signal fields. For example, it may include M in the HE-SIG-A field. M may be signaled as the number of sub-channels directly, or using the bandwidth field and/or other fields. Also, the STA1 may select M encoders or M MCS levers for SIG-B field on M sub-channels. The STA1 may signal the encoder and/or MCS information in the HE-SIG-A field. In addition, STA1 may begin self-contained spectral unequal coding on a second signal field, for example the HE-SIG-B field, which may introduce different HE-SIG-B fields from one sub-channel to another. As used herein, the SIG-B field on sub-channel k may be referred to as level k information. Each level may contain self-contained information. The second signal field may contain information such as duration, packet length, STA IDs and the like. Level 1 information may be encoded using encoder 1 or MCS 1 and transmitted on the first sub-channel. Level 2 information may be encoded using encoder 2 or MCS 2 and transmitted on the first sub-channel. Level M information may be encoded using encoder M or MCS M and transmitted on the first sub-channel.

STA2, as a receiver, may follow an example procedure. STA2 may determine the number of sub-channels M by checking the common signal field. For example, it may check the HE-SIG-A field. M may be signaled as the number of sub-channels directly, or using bandwidth field and/or other field. Further, STA2 may determine the coding schemes or MCS levels for each sub-channel by checking the common signal field, for example, the HE-SIG-A field. Also, STA2 may begin self-contained spectral unequal decoding on a second signal field, for example the HE-SIG-B field. The decoding procedure may be performed on each or some of the sub-channels. STA2 may perform a decoding procedure on one of the sub-channels. If the SIG-B field is decoded successfully, STA2 may stop the decoding procedure. Otherwise, it may continue decoding one of the rest sub-channels. STA2 may combine all of the received symbols, including them from the previously decoded sub-channel(s), together to decode the SIG-B field.

In another example, SIG procedures for a more efficient coding scheme may be used. With current 802.11 standards, all the signaling fields may be coded and modulated with the lowest MCS level, for example, MCS 0. In an embodiment, higher MCS may be used for the HE-SIG-B field. In an example, the MCS selection for the HE-SIG-B field may be implementation specific. In an embodiment, the MCS set for the HE-SIG-B may be all of the MCSs defined in the system. Or in another embodiment, it may be a subset of the entire MSC set. For example, it may be a basic MCS set for which all the STAs in the BSS support. The MCS for the HE-SIG-B may be signaled in the HE-SIG-A field.

Although the examples described herein consider 802.11 specific protocols, one of ordinary skill in the art will appreciate and understand that the examples are not restricted to this scenario and are applicable to other wireless systems and RATs as well. Further, although the term SIFS may be used herein to indicate various inter frame spacing in the examples of the designs and procedures, all other inter frame spacing, such as RIFS or other agreed time interval, may be applied in the same solutions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by an access point (AP), the method comprising:
   generating a multi user (MU) high efficiency (HE) physical layer protocol data unit (PPDU) (MU-HE-PPDU), wherein the MU-HE-PPDU comprises a high efficiency signal A (HE-SIG-A) field, a first high efficiency signal B (HE-SIG-B) portion and a second HE-SIG-B portion; and
   transmitting the MU-HE-PPDU from the AP to at least one station (STA),
   wherein the MU-HE-PPDU indicates a modulation and coding scheme (MCS) of at least one HE-SIG-B portion;
   wherein the MCS of the at least one HE-SIG-B portion is transmitted within the HE-SIG-A field;
   wherein the first HE-SIG-B portion is transmitted on a first channel and the second HE-SIG-B portion is transmitted on a second channel that is different than the first channel, and
   wherein the first HE-SIG-B portion includes one or more STA identifiers.

2. The method of claim 1, wherein the MU-HE-PPDU is transmitted on a first 20 megahertz (MHz) channel and a second 20 MHz channel.

3. The method of claim 1, wherein the second HE-SIG-B portion comprises a STA identifier that is different than a STA identifier included in the first HE-SIG-B portion.

4. The method of claim 1, wherein the HE-SIG-A field indicates a length of the first HE-SIG-B portion and the second HE-SIG-B portion.

5. The method of claim 1, wherein the first HE-SIG-B portion and the second HE-SIG-B portion are aligned in time.

6. The method of claim 1, wherein the first HE-SIG-B portion and the second HE-SIG-B portion are each limited to a 20 megahertz (MHz) channel.

7. The method of claim 1, wherein the first HE-SIG-B portion and the second HE-SIG-B portion are encoded differently.

8. The method of claim 1, further comprising transmitting the at least one HE-SIG-B portion in accordance with the indicated MCS.

9. The method of claim 1, wherein the first channel is at least a 20 megahertz (MHz) channel and the second channel is at least a 20 (MHz) channel.

10. The method of claim 1, wherein the first HE-SIG-B portion comprises a plurality of STA identifiers.

11. An access point (AP) comprising:
    a processor configured to generate a multi-user (MU) high efficiency (HE) physical layer protocol data unit (PPDU) (MU-HE-PPDU),
    wherein the MU-HE-PPDU comprises a high efficiency signal A (HE-SIG-A) field, a first high efficiency signal B (HE-SIG-B) portion and a second HE-SIG-B portion, and a transmitter configured to transmit the MU-HE-PPDU to at least one station (STA),
wherein the MU-HE-PPDU indicates a modulation and coding scheme (MCS) of at least one HE-SIG-B portion, and the MCS of the at least one HE-SIG-B portion is transmitted within the HE-SIG-A field,
wherein the first HE-SIG-B portion is transmitted on a first channel and the second HE-SIG-B portion is transmitted on a second channel that is different than the first channel, and
wherein the first HE-SIG-B portion includes one or more STA identifiers.

12. The AP of claim 11, wherein the MU-HE-PPDU is transmitted on a first 20 megahertz (MHz) channel and a second 20 MHz channel.

13. The AP of claim 11, wherein the second HE-SIG-B portion comprises a STA identifier that is different than every STA identifier included in the first HE-SIG-B portion.

14. The AP of claim 11, wherein the HE-SIG-A field indicates a length of the first HE-SIG-B portion and the second HE-SIG-B portion.

15. The AP of claim 11, wherein the first HE-SIG-B portion and the second HE-SIG-B portion are aligned in time.

16. The AP of claim 11, wherein the HE-SIG-A field spans a 40 megahertz (MHz) bandwidth.

17. The AP of claim 11, wherein the first HE-SIG-B portion and the second HE-SIG-B portion are each limited to a 20 megahertz (MHz) channel.

18. The AP of claim 11, wherein the first HE-SIG-B portion is at least a 20 megahertz (MHz) channel and the second HE-SIG-B portion is at least a 20 MHz channel.

19. The AP of claim 11, wherein the transmitter is further configured to transmit the HE-SIG-B portions in accordance with the indicated MCS.

20. The AP of claim 11, wherein the first HE-SIG-B portion and the second HE-SIG-B portion are encoded differently.

21. The AP of claim 11, wherein the first HE-SIG-B portion comprises a plurality of STA identifiers.

22. A method performed by a station (STA), the method comprising:
receiving data of a multi-user (MU) high efficiency (HE) physical layer protocol data unit (PPDU) (MU-HE-PPDU) from an access point (AP),
wherein the MU-HE-PPDU comprises a high efficiency signal A (HE-SIG-A) field, the MU-HE-PPDU comprises a first high efficiency signal B (HE-SIG-B) portion and a second HE-SIG-B portion,
wherein the MU-HE-PPDU indicates a modulation and coding scheme (MCS) of at least one HE-SIG-B portion within the HE-SIG-A field;
wherein the first HE-SIG-B portion is received on a first channel and the second HE-SIG-B portion is received on a second channel that is different than the first channel; and
wherein the first HE-SIG-B portion includes one or more STA identifiers.

23. The method of claim 22, wherein the MU-HE-PPDU is received on a first 20 megahertz (MHz) channel and a second 20 MHz channel.

24. The method of claim 22, wherein the second HE-SIG-B portion comprises a STA identifier that is different than a STA identifier included in the first HE-SIG-B portion.

25. The method of claim 22, wherein the HE-SIG-A field indicates a length of the first HE-SIG-B portion and the second HE-SIG-B portion.

26. The method of claim 22, wherein the first HE-SIG-B portion and the second HE-SIG-B portion are aligned in time.

27. The method of claim 22, wherein the HE-SIG-A field spans a 40 megahertz (MHz) bandwidth.

28. The method of claim 22, wherein the first HE-SIG-B portion and the second HE-SIG-B portion are each limited to a 20 megahertz (MHz) channel.

29. The method of claim 22, wherein the first HE-SIG-B portion is at least a 20 megahertz (MHz) channel and the second HE-SIG-B portion is at least a 20 MHz channel.

30. The method of claim 22, further comprising receiving the at least one HE-SIG-B portion in accordance with the indicated MCS.

31. The method of claim 22, wherein the first channel is at least a 20 megahertz (MHz) channel and the second channel is at least a 20 MHz channel.

32. The method of claim 22, wherein the first HE-SIG-B portion comprises a plurality of STA identifiers.

33. A station (STA) comprising:
a receiver configured to
receive data of a multi-user (MU) high efficiency (HE) physical layer protocol data unit (PPDU) (MU-HE-PPDU);
receive an HE signal A (HE-SIG-A) field of the MU-HE-PPDU, and an indication of a modulation and coding scheme (MCS) of an HE signal B (HE-SIG-B) field of the MU-HE-PPDU; and
receive the HE-SIG-B field in accordance with the indicated MCS, wherein the HE-SIG-B field comprises a plurality of STA identifiers,
wherein at least one of the STA identifiers of the HE-SIG-B field corresponds to an identifier of the STA,
wherein the HE-SIG-B field comprises a first HEE-SIG-B portion and a second HE-SIG-B portion which is different than the first HE-SIG-B portion, and
wherein the first HE-SIG-B portion is received on at least a first 20 megahertz (MHz) channel and the second HE-SIG-B portion is received on at least a second 20 MHz channel which is different than the first 20 MHz channel.

34. The STA of claim 33, wherein the MU-HE-PPDU is received on a first 20 MHz, channel and a second 20 MHz channel.

35. The STA of claim 33, wherein the second HE-SIG-B portion comprises a STA identifier that is different than a STA identifier included in the first HE-SIG-B portion.

36. The STA of claim 33, wherein the HE-SIG-A field indicates a length of the first HE-SIG-B portion and the second HE-SIG-B portion.

37. The STA of claim 33, wherein the first HE-SIG-B portion and the second HE-SIG-B portion are aligned in time.

38. The STA of claim 33, wherein the first HE-SIG-B portion and the second HE-SIG-B portion are each limited to a 20 MHz channel.

39. The STA of claim 33, wherein the first HE-SIG-B portion and the second HE-SIG-B portion are encoded differently.

40. The STA of claim 33, wherein the first channel is at least a 20 megahertz (MHz) channel and the second channel is at least a 20 MHz channel.

* * * * *

UNITED STATES PATENT AND TRADEMARK OFFICE
CERTIFICATE OF CORRECTION

PATENT NO. : 12,244,418 B2
APPLICATION NO. : 18/354857
DATED : March 4, 2025
INVENTOR(S) : Hanqing Lou et al.

Page 1 of 1

It is certified that error appears in the above-identified patent and that said Letters Patent is hereby corrected as shown below:

In the Claims

In Claim 34: Column 26, Line 46, delete "received on a first 20 MHz, channel and a second 20 MHz" and insert -- "received on a first 20 megahertz, MHz, channel and a second 20 MHz" --.

Signed and Sealed this
Twenty-first Day of October, 2025

John A. Squires
*Director of the United States Patent and Trademark Office*